(12) United States Patent
Akiba et al.

(10) Patent No.: US 11,913,126 B2
(45) Date of Patent: Feb. 27, 2024

(54) HYDROGEN-SYSTEM CONTROL DEVICE AND HYDROGEN-SYSTEM CONTROL METHOD

(71) Applicant: TOSHIBA ENERGY SYSTEMS & SOLUTIONS CORPORATION, Kawasaki (JP)

(72) Inventors: Takashi Akiba, Kawasaki Kanagawa (JP); Shingo Tamaru, Kawasaki Kanagawa (JP); Shin Kato, Yokohama Kanagawa (JP); Fumiyuki Yamane, Kawasaki Kanagawa (JP)

(73) Assignee: Toshiba Energy Systems & Solutions Corporation, Kawasaki (JP)

( * ) Notice: Subject to any disclaimer, the term of this patent is extended or adjusted under 35 U.S.C. 154(b) by 447 days.

(21) Appl. No.: 17/346,037

(22) Filed: Jun. 11, 2021

(65) Prior Publication Data

US 2021/0381120 A1 Dec. 9, 2021

Related U.S. Application Data

(63) Continuation of application No. PCT/JP2018/045722, filed on Dec. 12, 2018.

(51) Int. Cl.
| | |
|---|---|
| *H02J 15/00* | (2006.01) |
| *C25B 15/02* | (2021.01) |
| *C25B 1/04* | (2021.01) |
| *G05B 19/042* | (2006.01) |
| *H02J 3/38* | (2006.01) |
| *G06Q 50/06* | (2012.01) |

(Continued)

(52) U.S. Cl.
CPC ............... *C25B 15/02* (2013.01); *C25B 1/04* (2013.01); *G05B 19/042* (2013.01); *G06Q 50/06* (2013.01);

(Continued)

(58) Field of Classification Search
CPC .... H02J 3/381; H02J 3/144; H02J 3/28; H02J 15/008; Y04S 20/222; G06Q 50/06
See application file for complete search history.

(56) References Cited

U.S. PATENT DOCUMENTS

| | | | |
|---|---|---|---|
| 2005/0165511 A1 | 6/2005 | Fairlie | |
| 2015/0120077 A1 | 4/2015 | Kumazawa et al. | |

(Continued)

FOREIGN PATENT DOCUMENTS

| | | |
|---|---|---|
| JP | 2007-523580 A | 8/2007 |
| JP | 2014-23232 A | 2/2014 |

(Continued)

OTHER PUBLICATIONS

Nader A. El-Taweel et al., "Hydrogen Storage Optimal Scheduling for Fuel Supply and Capacity-Based Demand Response Program Under Dynamic Hydrogen Pricing," IEEE Trans. on Smart Grid, vol. 10, No. 4, pp. 4531-4542 (2019).

(Continued)

*Primary Examiner* — Michael W Choi
(74) *Attorney, Agent, or Firm* — Finnegan, Henderson, Farabow, Garrett & Dunner, LLP

(57) ABSTRACT

A hydrogen-system control device according to the present embodiment is a control system for a hydrogen system that produces hydrogen: a first setter; a second setter configured to set an actual power consumption amount obtained by reducing a reduced power amount from the first power consumption amount in advance, when the demand response for reducing the first power consumption amount in the request period is requested the device comprising: and a controller configured to control a power amount of the second power in the request period based on the actual power consumption amount. The second setter is configured to set the actual power consumption amount in a range in which the hydrogen system is able to achieve a target (Continued)

amount of hydrogen to be produced in a first period that includes the request period and is longer than the request period.

15 Claims, 15 Drawing Sheets

(51) Int. Cl.
 *H02J 3/28* (2006.01)
 *H02J 3/14* (2006.01)
(52) U.S. Cl.
 CPC ............... *H02J 3/144* (2020.01); *H02J 3/28* (2013.01); *H02J 3/381* (2013.01); *H02J 15/008* (2020.01); *G05B 2219/2639* (2013.01); *H02J 2300/20* (2020.01); *Y02B 70/3225* (2013.01); *Y04S 20/222* (2013.01)

(56) References Cited

U.S. PATENT DOCUMENTS

2017/0161849 A1 6/2017 Seki et al.
2017/0207629 A1 7/2017 Seki et al.

FOREIGN PATENT DOCUMENTS

| | | |
|---|---|---|
| JP | 2016-140161 A | 8/2016 |
| JP | 6005503 B2 | 10/2016 |
| JP | 2016-208694 A | 12/2016 |
| JP | 6038085 B2 | 12/2016 |
| JP | 6096735 B2 | 3/2017 |
| JP | 2017-107702 A | 6/2017 |
| JP | 6189448 B2 | 8/2017 |
| JP | 6441542 B2 | 12/2018 |
| JP | 6564131 B2 | 8/2019 |
| WO | WO 2020/121441 A1 | 6/2020 |

OTHER PUBLICATIONS

Xiaonan Wang et al., "Optimal scheduling of demand responsive industrial production with hybrid renewable energy systems," Renewable Energy, vol. 100, pp. 53-64 (2016).

Sayyad Nojavan et al., "Application of fuel cell and electrolyzer as hydrogen energy storage system in energy management of electricity energy retailer in the presence of the renewable energy sources and plug-in electric vehicles," Energy Conversion and Management, vol. 136, pp. 404-417 (2017).

| ITEM | SET VALUE |
|---|---|
| EC RATE (MW) | 10 |
| CONTRACTED POWER (MW) | 30 |
| EC EFFICIENCY | LINK TO SETTING SCREEN |
| DR CANDIDATE DATE AND TIME | LINK TO SETTING SCREEN |
⋮
FIG. 4
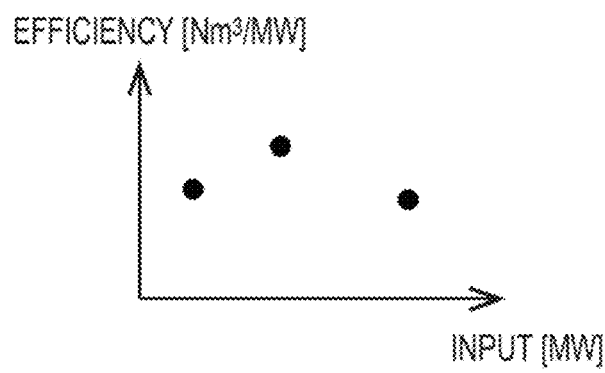
FIG. 5
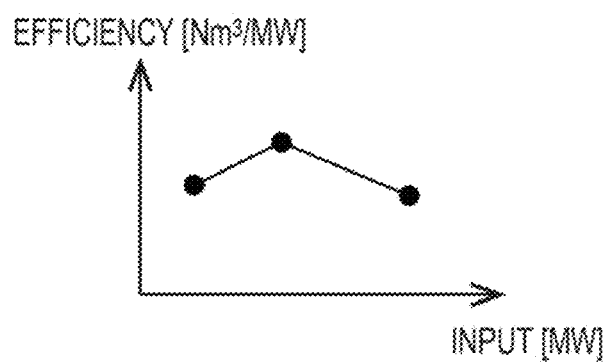
FIG. 6

| DR CANDIDATE DATE | DR CANDIDATE TIME |
|---|---|
| 2017/10/1 | 12:00 - 12:30 |
| 2017/10/1 | 12:30 - 13:00 |
| 2017/10/7 | 12:00 - 12:30 |
| 2017/10/7 | 12:30 - 13:00 |

HYDROGEN-SYSTEM CONTROL DEVICE AND HYDROGEN-SYSTEM CONTROL METHOD

CROSS-REFERENCE TO RELATED APPLICATIONS

This application is a continuation application of International Application No. PCT/JP2018/045722, filed Dec. 12, 2018. The contents of this application is incorporated herein by reference in their entirety.

FIELD

Embodiments of the present invention relate to a hydrogen-system control device and a hydrogen-system control method.

BACKGROUND

Hydrogen energy is attracting attention as new energy. Hydrogen is produced by a hydrogen production device of a hydrogen system and stored in a hydrogen tank. The hydrogen stored in the hydrogen tank can be reconverted into power by a hydrogen power generator. Therefore, by connecting the hydrogen system to a power grid, it is possible to both supply power from the power grid and supply power to the power grid. In this manner, by the hydrogen system, it is possible to stabilize the power grid and respond to hydrogen demand.

Further, the importance of demand response that changes the pattern of power consumption in the hydrogen system in accordance with the state of power supply of the power grid has come to be recognized. An example of the pattern of power consumption is a power-consumption reduction type where peak shaving of the amount of power consumption in the power grid is performed. However, when power consumption is reduced, there is a risk that the amount of hydrogen produced by the hydrogen system does not reach a target amount.

An object to be solved by the present invention is to provide a hydrogen-system control device and a hydrogen-system control method that can produce a target amount of hydrogen in a hydrogen energy system even when power supplied from a power grid is reduced in a request period.

BRIEF DESCRIPTION OF THE DRAWINGS

FIG. 4 is a diagram illustrating a display image example of each parameter.

FIG. 5 is a diagram illustrating an image example for setting EC efficiency.

FIG. 6 is a diagram illustrating an example of interpolation of efficiency of a hydrogen production device.

DETAILED DESCRIPTION

Figure 1:
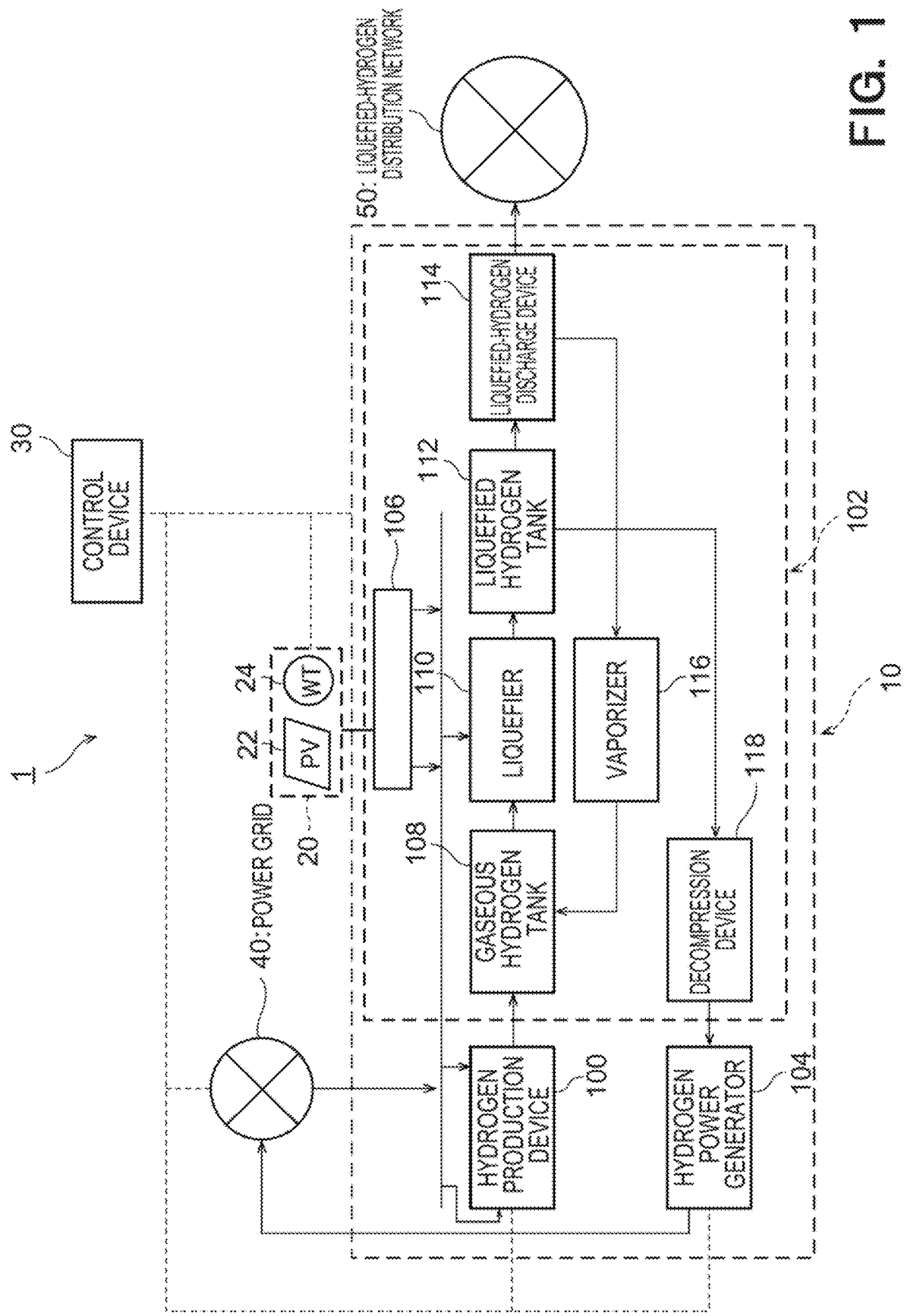
FIG. 1 is a block diagram illustrating a configuration of a hydrogen energy system according to a first embodiment.

A hydrogen-system control device according to the present embodiment is a control device for a hydrogen system that produces hydrogen by first power supplied from a renewable-energy power generator and second power supplied from a power grid, the device comprising: a first setter configured to set, in a demand-response request period in advance, a baseline indicating a first power consumption amount of the second power to be consumed when there is no request of demand response; a second setter configured to set an actual power consumption amount obtained by reducing a reduced power amount from the first power consumption amount in advance, when the demand response for reducing the first power consumption amount in the request period is requested; and a controller configured to control a power amount of the second power in the request period based on the actual power consumption amount, wherein the second setter is configured to set the actual power consumption amount in a range in which the hydrogen system is able to achieve a target amount of hydrogen to be produced in a first period that includes the request period and is longer than the request period.

According to the present embodiment, it is possible to produce a target amount of hydrogen in a hydrogen energy system even when power supplied from a power grid is reduced in a request period.

A hydrogen-system control device and a hydrogen-system control method according to embodiments of the present invention will now be explained in detail with reference to the accompanying drawings. The embodiments described below are only examples of the embodiments of the present invention and it is not to be understood that the present invention is limited to these embodiments. In the drawings referred to in the embodiments, same parts or parts having identical functions are denoted by like or similar reference characters and there is a case where redundant explanations thereof are omitted. Further, for convenience of explanation, there are cases where dimensional ratios of the parts in the drawings are different from those of actual products and some part of configurations is omitted from the drawings.

First Embodiment

FIG. 1 is a block diagram illustrating a configuration of a hydrogen energy system 1 according to a first embodiment.

As illustrated in FIG. 1, the hydrogen energy system 1 according to the present embodiment is a system that produces hydrogen, and is configured to include a hydrogen system 10, a renewable-energy power generator 20, and a control device 30. FIG. 1 further illustrates a power grid 40 and a liquefied-hydrogen distribution network 50.

The hydrogen system 10 produces hydrogen by first power generated by the renewable-energy power generator 20 and second power supplied from the power grid 40. A detailed configuration of the hydrogen system 10 will be described later.

The renewable-energy power generator 20 includes a natural energy-derived power facility and generates the first power. This renewable-energy power generator 20 includes, for example, a photovoltaic power generator 22 using sunlight and a wind turbine generator 24 that generates power using wind. This renewable-energy power generator 20 does not require fuel such as fossil fuel, but the power generation amount thereof is unstable because of environmental influences such as the weather and wind power. The renewable-energy power generator 20 may be a power generator that uses new energy such as biomass or biomass-derived waste.

The control device 30 controls the hydrogen system 10, the renewable-energy power generator, and the second power supplied from the power grid. A detailed configuration of the control device 30 will be described later.

The power grid 40 supplies power generated by, for example, a thermal power plant to the hydrogen system 10, the renewable-energy power generator 20, and the control device 30 via a power grid.

The liquefied-hydrogen distribution network 50 is a distribution network that transports hydrogen as a liquid and supplies it to a hydrogen consumer.

Here, a detailed configuration of the hydrogen system 10 is described. The hydrogen system 10 includes a hydrogen production device 100, a hydrogen storage and supply device 102, and a hydrogen power generator 104.

The hydrogen production device 100 is, for example, a water electrolysis device that produces hydrogen and oxygen by causing an electric current to pass through an alkaline solution. Further, the hydrogen production device 100 stores the produced hydrogen in a gaseous hydrogen tank 108 of the hydrogen storage and supply device 102 via a hydrogen pipe. That is, this hydrogen production device 100 produces hydrogen by the first power generated by the renewable-energy power generator 20 and the second power supplied from the power grid 40, and stores the produced hydrogen in the hydrogen storage and supply device 102.

The hydrogen storage and supply device 102 stores therein the hydrogen produced by the hydrogen production device 100 and supplies liquefied hydrogen via the liquefied-hydrogen distribution network 50. Details of the hydrogen storage and supply device 102 will be described later.

The hydrogen power generator 104 generates power and heat using the hydrogen supplied from the hydrogen storage and supply device 102. The heat generated here is supplied to a hot water network as hot water, for example. The hydrogen power generator 104 includes a fuel cell, for example. As for oxygen, the hydrogen power generator 104 may use oxygen in the air or oxygen that is produced by the hydrogen production device 100 in association with production of hydrogen and is stored in an oxygen tank.

Here, the configuration of the hydrogen storage and supply device 102 is described in detail. The hydrogen storage and supply device 102 is configured to include a power conditioner device 106, the gaseous hydrogen tank 108, a liquefier 110, a liquefied hydrogen tank 112, a liquefied-hydrogen discharge device 114, a vaporizer 116, and a decompression device 118.

The power conditioner device 106 is configured to include a converter, for example. The converter converts direct-current power output from the renewable-energy power generator 20 into predetermined alternating-current power.

The gaseous hydrogen tank 108 stores therein the gaseous hydrogen produced by the hydrogen production device 100. The gaseous hydrogen tank 108 is connected to the hydrogen production device 100 and the liquefier 110 via a pipe, and supplies the gaseous hydrogen to the liquefier 110.

The liquefier 110 is, for example, a cooler/compressor and converts the gaseous hydrogen supplied from the gaseous hydrogen tank 108 into liquefied hydrogen. The liquefier 110 converts the hydrogen supplied from the gaseous hydrogen tank 108 into liquefied hydrogen and supplies it to the liquefied hydrogen tank 112 via a pipe.

The liquefied hydrogen tank 112 stores therein the liquefied hydrogen supplied from the liquefier 110. The liquefied hydrogen tank 112 stores therein the liquefied hydrogen supplied from the liquefier 110 and also supplies the liquefied hydrogen to the liquefied-hydrogen discharge device 114 via a pipe.

The liquefied-hydrogen discharge device 114 supplies the liquefied hydrogen supplied from the liquefied hydrogen tank 112 to the liquefied-hydrogen distribution network 50 and the vaporizer 116. The liquefied-hydrogen discharge device 114 may be integrated with the liquefied hydrogen tank 112.

The vaporizer 116 converts the liquefied hydrogen supplied from the liquefied-hydrogen discharge device 114 into gaseous hydrogen. That is, the vaporizer 116 converts the liquefied hydrogen supplied from the liquefied-hydrogen discharge device 114 into gaseous hydrogen and supplies it to the gaseous hydrogen tank 108 via a pipe.

The decompression device 118 is connected to the liquefied hydrogen tank 112 and the hydrogen power generator 104 via a pipe. That is, the decompression device 118 decompresses the liquefied hydrogen supplied from the liquefied hydrogen tank 112 via the pipe, and supplies the decompressed hydrogen to the hydrogen power generator 104 via the pipe.

Figure 2:
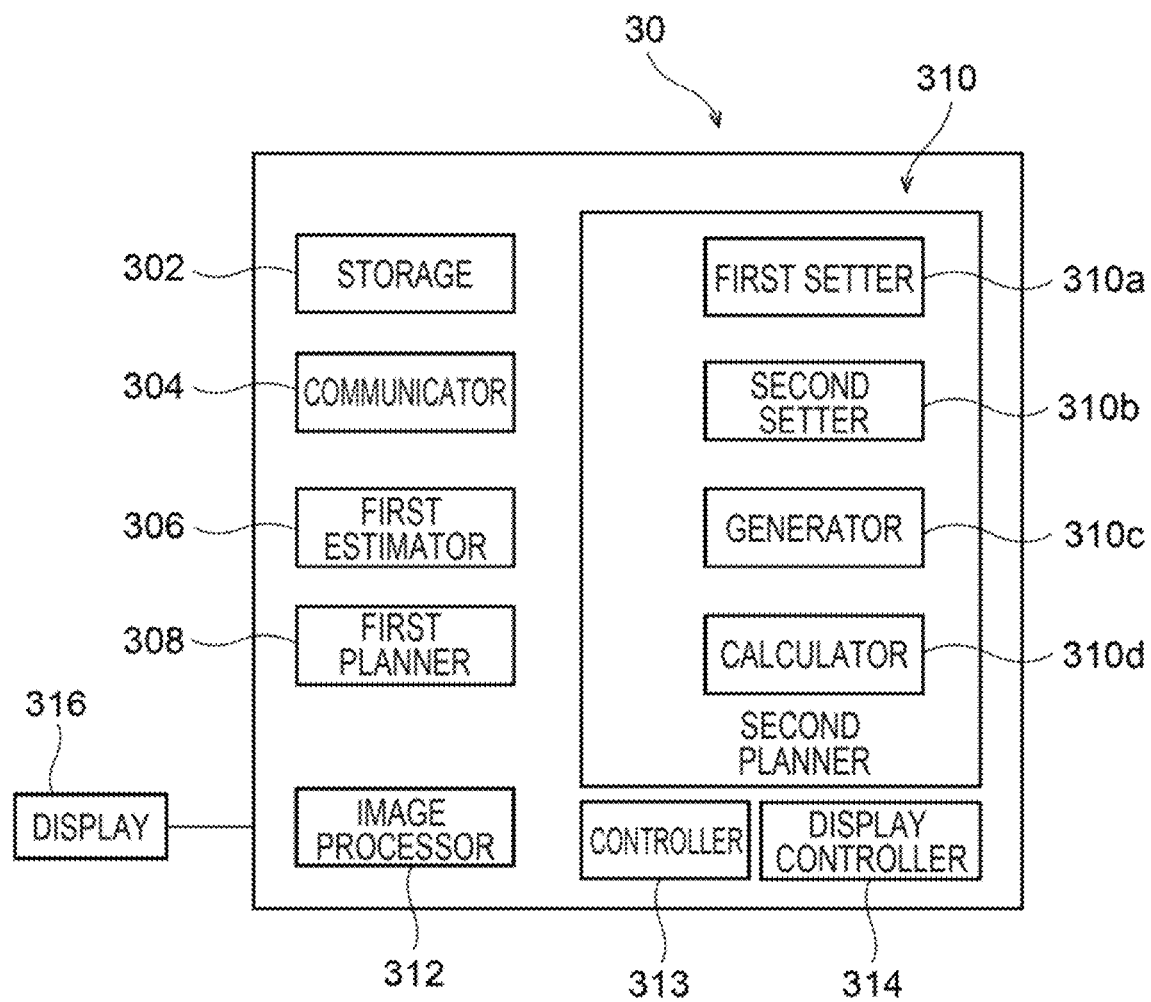
FIG. 2 is a block diagram illustrating a detailed configuration of a control device.

FIG. 2 is a block diagram illustrating a detailed configuration of the control device 30. As illustrated in FIG. 2, the control device 30 is configured to include, for example, a CPU (Central Processing Unit) and includes a storage 302, a communicator 304, a first estimator 306, a first planner 308, a second planner 310, an image processor 312, a controller 313, a display controller 314, and a display 316. The control device 30 executes a program stored in the storage 302, thereby implementing respective functions of the communicator 304, the first estimator 306, the first planner 308, the second planner 310, the image processor 312, the controller 313, and the display controller 314. Each of the communicator 304, the first estimator 306, the first planner 308, the second planner 310, the image processor 312, the controller 313, and the display controller 314 may be configured by an independent electronic circuit.

The storage 302 is implemented by a semiconductor memory element such as a RAM (Random Access Memory) or a flash memory, or a hard disk, for example. This storage 302 memorizes the program to be executed by the control device 30 and various control data therein.

The communicator 304 communicates with an external network to acquire weather forecast data for 60 days, for example. The weather forecast data is data for every unit time for every 30 minutes, for example.

The first estimator 306 estimates the power generation amount of the renewable-energy power generator 20 based on the weather forecast data acquired by the communicator 304. The first estimator 306 estimates a first power generation amount for 60 days. The first power generation amount is the amount of power generated by the renewable-energy power generator 20 for every unit time for every 30 minutes, for example. The first estimator 306 estimates the first power generated by the renewable-energy power generator 20 by a general estimation method, such as regression analysis or neural network. Further, the first estimator 306 adds a estimated power generation amount of the renewable-energy power generator 20 for every 30 minutes to calculate the power generation amount of the first power generated by the renewable-energy power generator 20 for each day.

The first planner 308 generates a long-term plan of the hydrogen system 10 for 60 days, for example. Details of the first planner 308 will be described later.

The second planner 310 generates a short-term plan of the hydrogen system 10, for example, one to seven days based on the long-term plan of the first planner 308. Details of the second planner 310 will be also described later.

The image processor 312 generates planned values of the first planner 308 and the second planner 310 and various types of information as images. The controller 313 controls each device in the hydrogen energy system 1 based on the long-term plan of the first planner 308 and the short-term plan of the first planner 308.

The display controller 314 displays the images generated by the image processor 312 on the display 316. For example, the display 316 is a monitor and displays images and the like generated by the image processor 312.

Figure 3:
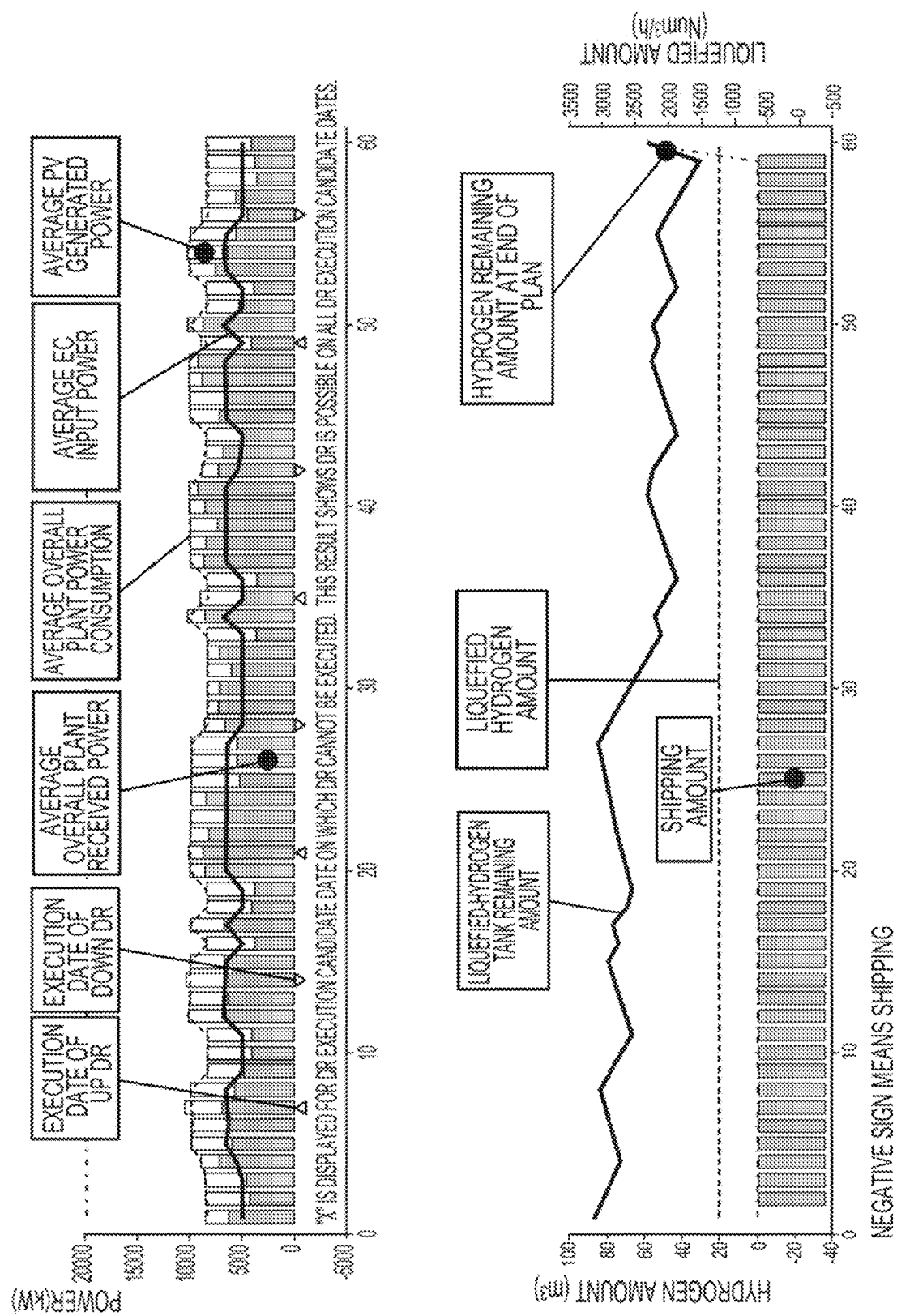
FIG. 3 is a diagram illustrating an example in which a long-term plan is displayed as images.

Here, details of processing by the first planner 308 are described. FIG. 3 illustrates an example in which a long-term plan generated by the first planner 308 is displayed as images on the display 316. The upper diagram illustrates, for each day, first power of the renewable-energy power generator 20 as average PV generated power, power consumption of the entire hydrogen system 10 as average overall plant power consumption, second power supplied from the power grid 40 as average overall plant received power, and input power of the hydrogen production device 100 as average EC input power.

The lower diagram illustrates the liquefied hydrogen amount that is the hydrogen production amount of the hydrogen production device 100, the liquefied-hydrogen tank remaining amount stored in the liquefied hydrogen tank 112, and the shipping amount of hydrogen. The horizontal axis represents a date, the vertical axis in the upper diagram represents power, and the vertical axis in the lower diagram represents the amount of hydrogen.

As illustrated in FIG. 3, the first planner 308 plans, for each day, the first power, the power consumption of the entire hydrogen system 10, the second power supplied from the power grid 40, and the input power of the hydrogen production device 100. In addition, the first planner 308 plans, for each day, the liquefied hydrogen amount, the shipping amount of hydrogen, and the liquefied-hydrogen tank remaining amount.

More specifically, the first planner 308 calculates the liquefied hydrogen amount for each day based on the liquefied-hydrogen tank remaining amount and the shipping amount, and sets the calculated amount as planning information. Further, the first planner 308 calculates the input power of the hydrogen production device 100 for each day based on the liquefied hydrogen amount for each day, and sets the calculated amount as planning information. Next, the first planner 308 calculates the power consumption of the entire hydrogen system 10 based on the input power of the hydrogen production device 100 for each day, and sets the calculated power consumption as planning information. That is, as the power consumption of the entire hydrogen system 10, power consumption of each device in the hydrogen system 10 is added to the input power of the hydrogen production device 100.

The power consumption of each device in the hydrogen system 10 includes, for example, power consumption of the liquefier 110. The power consumption of the liquefier 110 is determined in accordance with a liquefier load factor. The liquefier load factor of the liquefier 110 indicates the processing capacity of the liquefier 110 and is set for every 24 hours, for example. The first planner 308 subtracts the estimated first power of the renewable-energy power generator 20 for each day from the power consumption of the entire hydrogen system 10 to calculate the second power as a planned value received from the power grid 40, and sets the calculation result as planning information.

FIG. 4 is a diagram illustrating a display image example of each parameter set by the first planner 308. As illustrated in FIG. 4, the first planner 308 sets rated power of the hydrogen production device 100 and contracted power of the second power received from the power grid 40. Further, when an operator selects a link to a setting screen of EC efficiency, the screen example of FIG. 5 described later is displayed. When the operator selects a link to a setting screen of a DR candidate date and time, the screen example of FIG. 7 described later is displayed.

FIG. 5 is a diagram illustrating an image example for setting efficiency of the hydrogen production device 100. As illustrated in FIG. 5, the first planner 308 sets the efficiency of the hydrogen production device 100 in accordance with input power. The efficiency of the hydrogen production device 100 indicates, for example, a ratio of the hydrogen production amount to the input power.

The hydrogen production device 100 according to the present embodiment has a shortening mode in which a start-stop time can be shortened when hydrogen production is stopped for a short time. Further, the hydrogen production device 100 may be stopped when demand response (hereinafter, also "DR") is requested. When hydrogen production by the hydrogen production device 100 is stopped as described above, the input power until the stop is gradually decreased, and when hydrogen is produced again, the input power is gradually increased. As the input power changes, the hydrogen production amount changes. Since the efficiency can be set with respect to, for example, the input power, the first planner 308 sets the efficiency of the hydrogen production device 100 in accordance with the time of execution of demand response, for example.

Demand response means that a consumption pattern is changed in accordance with a state of power supply. There are two types of demand response: so-called "down DR" (FIG. 3) as "demand reduction" and so-called "up DR" (FIG. 3) as "demand increase". The former one can perform peak shaving of the power grid 40 effectively. The latter one contributes to stabilization of the quality of electricity, for example, the voltage or the frequency by promoting increase in consumption of power to a consumer when excessive supply of power occurs.

FIG. 6 is a diagram illustrating an example of interpolation of efficiency of the hydrogen production device 100. As illustrated in FIG. 6, the first planner 308 interpolates efficiency set in the hydrogen production device 100. For example, the first planner 308 performs spline interpolation for the efficiency set in the hydrogen production device 100. Accordingly, it is possible to set the efficiency of the hydrogen production device 100 for all values of the input power.

Figures 7, 8:
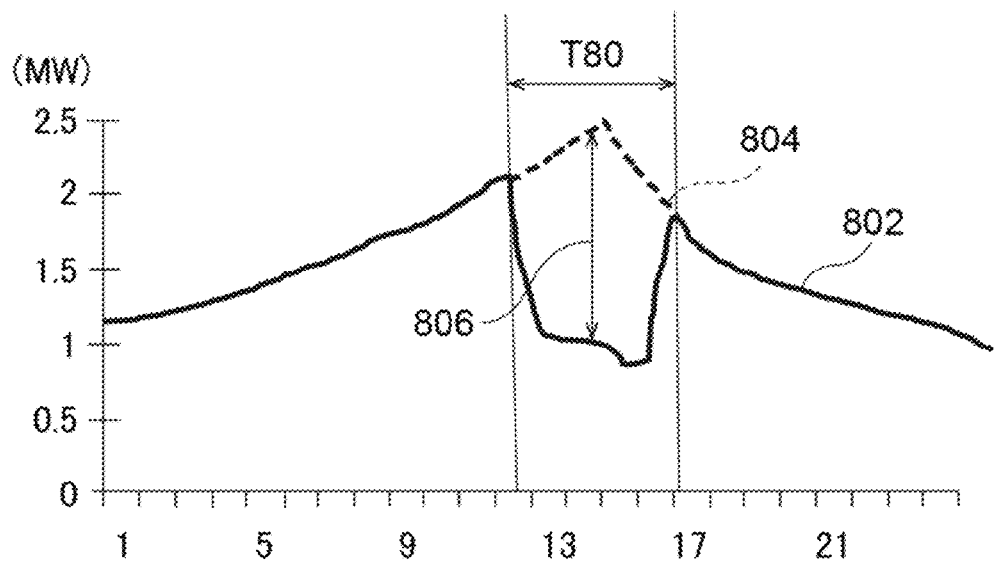
FIG. 7 is a diagram illustrating an example of a setting screen of a date and time of demand response.
FIG. 8 is a diagram illustrating an example of down DR.

FIG. 7 is a diagram illustrating an example of a setting screen of a date and time of demand response set by the first planner 308. As illustrated in FIG. 7, the first planner 308 sets the date and time of demand response. More specifically, the first planner 308 sets the date and time of "down DR (FIG. 3)" and the date and time of "up DR (FIG. 3)". Further, the first planner 308 may plan the liquefied-hydrogen tank remaining amount, assuming that the hydrogen production amount of the hydrogen production device 100 is 0 in the period of "down DR (FIG. 3)". This makes it possible to further suppress supply of second power when down DR is performed.

Further, it is possible to determine a shipping time of liquefied hydrogen to any time. Therefore, the first planner 308 plans to store the shipping amount on a scheduled shipping date in the liquefied hydrogen tank 112, for example, until 00:00 that is the start of the scheduled shipping date and the end of the previous day. Furthermore, the first planner 308 performs planning so as to satisfy conditions such as being within the performance range of each device and being within the contracted power as constraint conditions when a long-term plan is planned. As a method of making the long-term plan, a method of expressing input and output of a device by a mathematical expression and optimizing the input and output by mathematical optimization or metaheuristic may be used. By such processing, the first planner 308 plans a liquefier load factor, the target hydrogen storage amount (a lower limit), a scheduled DR date, a time zone, and the like, in addition to the above-described information. The first planner 308 then outputs the planned information to the image processor 312. Accordingly, the image processor 312 generates, for example, image data illustrated in FIG. 3 described above.

Here, details of the second planner 310 are described. As illustrated in FIG. 2, the second planner 310 includes a first setter 310a, a second setter 310b, a generator 310c, and a calculator 310d.

FIG. 8 is a diagram illustrating an example of down DR. The vertical axis represents power and the horizontal axis represents a time. Actual power consumption 802 indicates the second power supplied from the power grid 40 (FIG. 1), a baseline 804 indicates the second power in a request period T80 expected when there is no request of DR, and reduced power 806 indicates a difference between the baseline 804 and the actual power consumption 802.

The first setter 310a sets the baseline 804, which is the first power consumption amount of the second power to be consumed when there is no request of demand response, in the request period T80 of demand response. The first setter 310a according to the present embodiment sets the baseline 804 based on, for example, a concept of statistically estimated load. The baseline 804 indicates the first power consumption amount of the second power in the request period T80, which is to be consumed when there is no request of demand response. That is, when the power indicated by the baseline 804 is integrated in the request period T80, the result of integration is the first power consumption amount obtained by integrating the second power in the request period T80.

Figure 9:
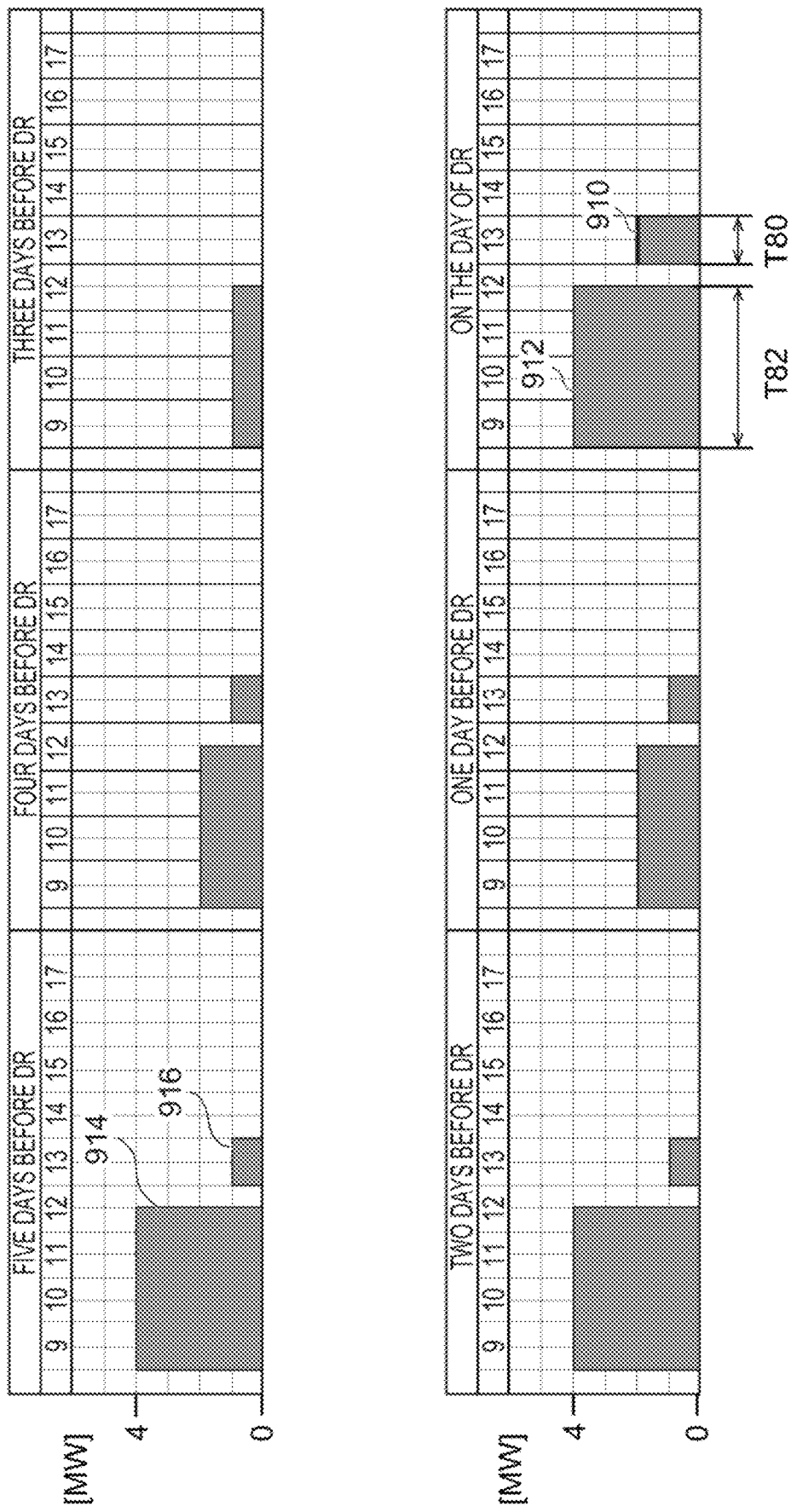
FIG. 9 is a diagram illustrating a setting example of a baseline.

FIG. 9 is a diagram conceptually illustrating a setting example of a baseline. FIG. 9 illustrates power consumption of the second power on the DR date and five days to one day before DR. The vertical axis represents power and the horizontal axis represents time. In FIG. 9, the DR request period T80 includes two frames of 13:00 to 13:30 and 13:30 to 14:00 on the DR date. Further, FIG. 9 illustrates a baseline 910 on the DR date and power consumption 912 in a period of six frames in units of 30 minutes from four hours before to one hour before the DR request period T80. Furthermore, FIG. 9 illustrates power consumption 914 corresponding to the power consumption 912 from five days before to one day before DR and power consumption 916 in a period corresponding to the DR request period T80 from five days before to one day before DR.

As illustrated in FIG. 9, the first setter 310a obtains average power consumption for four days on which the average demand amount in a DR execution time zone corresponding to the DR request period T80 is large, among the last five days of the DR execution date not including the DR execution date. For example, since average power consumption on three days before DR is 0 megawatt and average power consumption of each day except for three days before DR is 1 megawatt, average power consumption in the DR execution time zone of four days except for the average power consumption of three days before DR is 1 megawatt.

Next, the first setter 310a calculates, with regard to six frames (the predetermined time zone T82) in units of 30 minutes from four hours before to one hour before the DR execution time, an average value of (the demand amount on the DR execution date)−(a value calculated by the above-described calculation method). For example, the demand amount on the DR execution date is 4 megawatts. Further, average power consumption five days before DR is 4 megawatts, average power consumption four days before DR is 2 megawatts, average power consumption four days before DR is 2 megawatts, average power consumption three days before DR is 1 megawatt, average power consumption two days before DR is 4 megawatts, and average power consumption one day before DR is 2 megawatts. Therefore, average power consumption for four days excluding the average power consumption three days before DR that is 1 megawatt is 3 megawatts. Accordingly, (the demand amount on the DR execution date)−(the value calculated by the above-described calculation method) is 1 megawatt obtained by subtracting 3 megawatts from 4 megawatts.

Next, the first setter 310a adds the average value of (the demand amount on the DR execution date)−(the value calculated by the above-described calculation method) to the above-calculated average power consumption for four days corresponding to the time zone of DR execution, and sets the resultant value as a baseline. For example, the first setter 310a adds 1 megawatt that is the average value of (the demand amount on the DR execution date)−(the value calculated by the above-described calculation method) to 1 megawatt that is the average power consumption in the time zone of DR execution for four days, and sets 2 megawatts as the baseline. As described above, the first setter 310a sets the baseline 910 based on a value obtained by adding a difference value between an average value of the second power corresponding to the predetermined time zone T82 on a plurality of days before the date including the request period T80 (the DR date) (one, two, four, and five days before DR) and an average value of the second power in the predetermined time zone T82 to an average value of the second power in the request period T80 on the plural days (one, two, four, and five days before DR).

The second setter 310b sets the actual power consumption amount that is the amount of power consumption of the second power to be consumed when demand response is requested. That is, when demand response for reducing the first power consumption amount in the request period T80 is requested, the second setter 310b sets the actual power consumption amount obtained by reducing the reduction power amount from the first power consumption amount in advance. As illustrated in FIG. 8, the reduced power amount is an integrated value of the reduced power 806 in the request period T80.

Further, the second setter 310b calculates the reduced power amount that is a difference between the baseline and the actual power consumption amount based on the target amount of hydrogen to be generated by the hydrogen system 10 in a first period that is longer than the DR request period T80 and includes the request period T80, For example, the first period is 24 hours including the request period T80.

The second setter 310b may set the actual power consumption amount in a range in which the target amount of hydrogen can be produced, expecting a case where the first power supplied during the DR request period T80 is 0 or a predetermined value or less. This setting can reduce a dependency rate of the first electric power that is highly variable on hydrogen production, and thus the possibility of achieving the target amount of hydrogen is further increased.

For example, the second setter 310b sets the actual power consumption amount based on the possible amount of hydrogen production of the hydrogen system 10 in a second period in the first period excluding the request period T80. Accordingly, it is possible to achieve the target amount of hydrogen even if hydrogen production cannot be performed because of DR in the request period T80. In a more specific example, the second setter sets the actual power consumption amount based on the hydrogen production amount in a case where the hydrogen production device 100 of the hydrogen system 10 is caused to operate at a rated load in the second period in the first period excluding the DR request period T80. In this case, the hydrogen production device 100 may be stopped in the DR request period T80, and the hydrogen production amount of the hydrogen production device 100 in a transition period in a case of causing the hydrogen production device 100 to operate at a rated load may be set.

Figure 10:
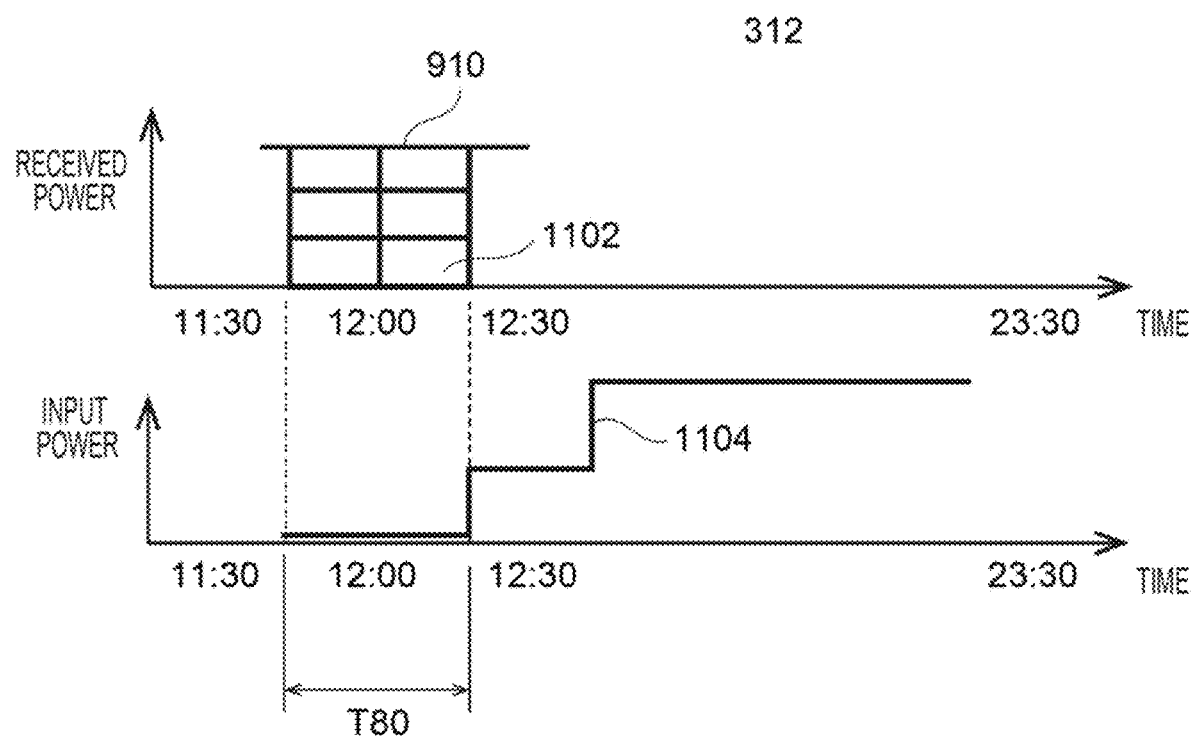
FIG. 10 is a diagram illustrating a slot below a baseline and input power of the hydrogen production device.

FIG. 10 conceptually illustrates a slot 1102 below the baseline 910 and input power 1104 of the hydrogen production device 100. The DR request period T80 is from 11:30 to 12:30. An example of down DR is illustrated here. The upper diagram illustrates the slot 1102 below the baseline 910, and the lower diagram illustrates the input power 1104 of the hydrogen production device 100. The horizontal axis in the upper diagram and the lower diagram represents a time, the vertical axis in the upper diagram represents received power of the second power, and the vertical axis in the lower diagram represents input power of the hydrogen production device 100. Although the example in FIG. 10 is an example in which hydrogen production by the hydrogen production device 100 is stopped during the DR request period T80, the present invention is not limited thereto. Further, the slot 1102 means the magnitude of unit power obtained by equally dividing power below the baseline 910. For example, a value obtained by dividing the power indicated by the baseline 910 by N, such as three, corresponds to the length of the vertical side of the slot 1102.

Figure 11:
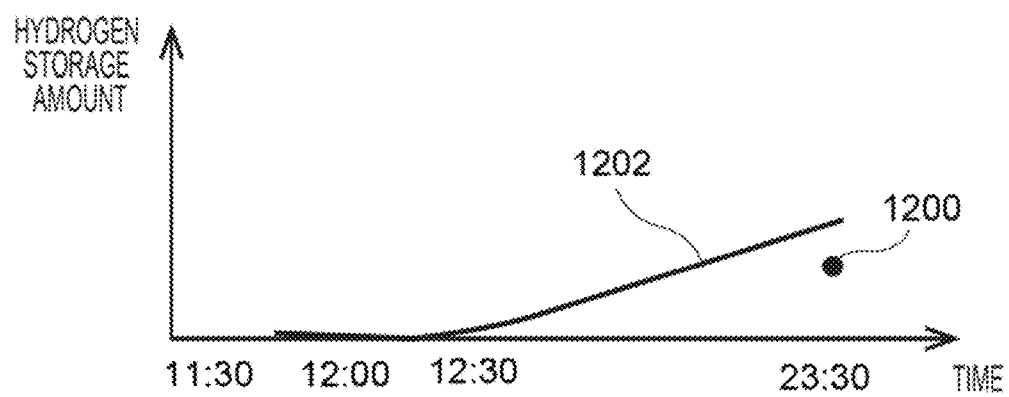
FIG. 11 is a conceptual diagram of an example of a target hydrogen amount and a hydrogen storage amount.

FIG. 11 is a conceptual diagram of an example of a target hydrogen amount 1200 and the hydrogen storage amount stored in the liquefied hydrogen tank 112. The vertical axis represents the hydrogen storage amount to be stored in the liquefied hydrogen tank 112 after the time of DR execution, and the horizontal axis represents a time. The target hydrogen amount 1200 in FIG. 12 is a value at 00:00 that is the start of a scheduled shipping date and the end of the previous day.

Figure 12:
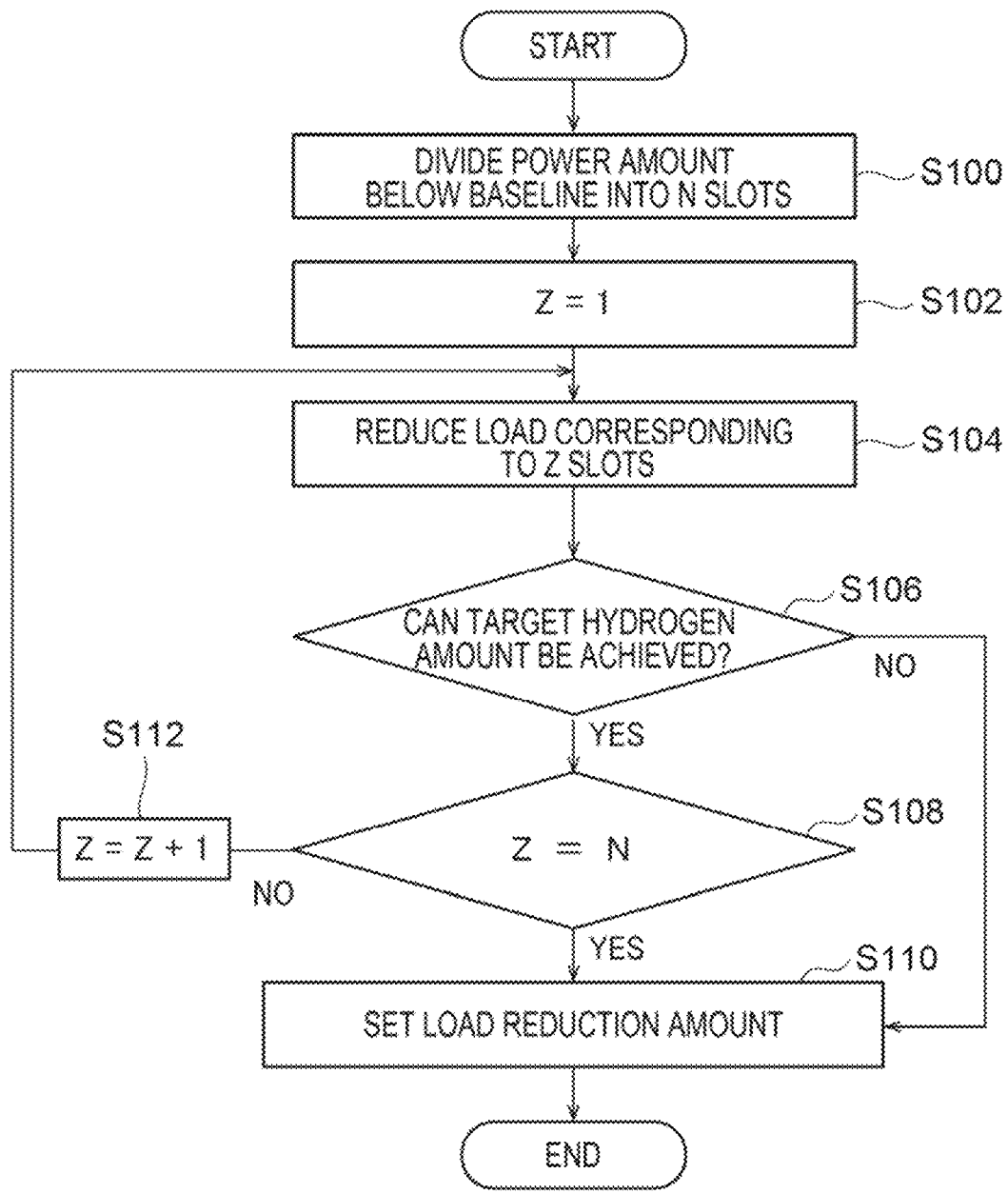
FIG. 12 is a flowchart illustrating an example of processing for setting an actual power consumption amount.

A processing example of the second setter 310b is described by way of FIG. 12, with reference to FIGS. 8, 10, and 11. FIG. 12 is a flowchart illustrating an example of processing of the second setter 310b for setting the actual power consumption amount.

First, the second setter 310b generates the slot 1102 (FIG. 10) obtained by dividing a baseline in the DR request period T80 set by the first setter 310a by N (Step S100). The number of divisions is not limited and may be 1000, for example. Further, with regard to the power generation amount of the renewable-energy power generator 20 in units of 30 minutes estimated by the first estimator 306 (FIG. 2), the second setter 310b sets a value in the DR request period T80 to 0. Accordingly, it is possible to perform the actual power consumption amount in the DR request period T80 with higher accuracy.

Next, the second setter 310b sets 1 to Z (Step S102).

Next, the second setter 310b performs reduction by the reduced power amount corresponding to the Z slot 1102 (Step S104). In this case, the second setter 310b calculates the hydrogen production amount when reduction by the reduction power amount is performed, based on efficiency of the hydrogen production device 100.

Next, the second setter 310b determines whether the target hydrogen amount 1200 (FIG. 11) can be achieved even when this reduction by the reduced power amount is performed (Step S106). If the target hydrogen amount can be achieved (YES at Step S106), it is determined whether Z is N (Step S108), and if Z=N is established (YES at Step S108), the reduced power amount corresponding to the slots 1102 the number of which is obtained by subtracting 1 from the current Z is set (Step S110), and the processing is ended.

On the other hand, if the target hydrogen amount 1200 (FIG. 11) cannot be achieved (NO at Step S106), the process in Step S110 is performed. Further, if Z is not N (NO at Step S108), 1 is added to Z (Step S112), and the processes from Step S104 are repeated. The second setter 310b sets the actual power consumption amount by subtracting the reduced power amount corresponding to the slots 1102 finally reduced from the baseline 910.

Although the second setter 310b according to the present embodiment sets the power generation amount in units of 30 minutes estimated by the first estimator 306 (FIG. 2) to 0 in the DR request period T80, the present invention is not limited thereto. The estimated power generation amount in units of 30 minutes may be used. Alternatively, the power generation amount of the renewable-energy power generator 20 that is set to a predetermined value or less by multiplying the estimated power generation amount in units of 30 minutes by a predetermined ratio may be used.

As described above, the second setter 310b determines whether the target hydrogen amount 1200 (FIG. 11) can be achieved while increasing the reduced power amount. The second setter 310b then sets the actual power consumption amount based on a limit value of the reduced power amount for which the target hydrogen amount 1200 (FIG. 11) can be achieved. When the actual power consumption amount is set, the controller 313 described above controls the second power in the request period T80 based on the power consumption amount set by the second setter 310b.

The generator 310c illustrated in FIG. 2 generates an evaluation function in which a value obtained by multiplying the power amount of the second power by a first coefficient, a value obtained by multiplying the amount of a portion of the first power, which is supplied to the power grid 40, by a second coefficient, a value obtained by multiplying the reduced power amount in down DR by a third coefficient, a value obtained by multiplying the load increase/decrease amount in up DR by a fourth coefficient, and a value obtained by multiplying the production amount of hydrogen by a fifth coefficient are added for every unit time in the first period for which a plan is generated.

[Formula 1]

$$E = (OBJ_{exp}^{gr\_pchs} + OBJ_{exp}^{gr\_sell} + OBJ_{exp}^{dr} + OBJ_{exp}^{h2}) \quad (1)$$

Formula (1) is an example of the evaluation formula generated by the generator 310C.

[Formula 2]

$$OBJ_{exp}^{gr\_pchs} = \Sigma_{t=1}^{T}(0.5 \cdot C_t^{gr\_pchs} \cdot x_t^{gr\_pchs}) \quad (2)$$

Formula (2) represents the value obtained by multiplying the power amount of the second power by the first coefficient when the unit time is 30 minutes, where t represents a unit time and T represents the first period. When the first period is seven days, for example, T=336 is established.

[Expression 3]

$$C_t^{gr\_pchs} \quad (3)$$

[Expression 4]

$$x_t^{gr\_pchs} \quad (4)$$

Here, Expression (3) is a coefficient at a time t, and a value obtained by multiplying the coefficient represented by Expression (3) by 0.5 is the first coefficient. Expression (4) represents the power amount of the second power at the time t. For example, Formula (2) corresponds to expense [yen] of power purchase from the power grid 40.

[Formula 5]

$$OBJ_{exp}^{gr\_sell} = \Sigma_{t=1}^{T}(-0.5 \cdot C_t^{gr\_sell} \cdot x_t^{gr\_sell}) \quad (5)$$

Formula (5) represents the value obtained by multiplying the amount of the portion of the first power, which is supplied to the power grid 40, by the second coefficient.

[Expression 6]

$$C_t^{gr\_sell} \quad (6)$$

[Expression 7]

$$x_t^{gr\_sell} \quad (7)$$

Here, Expression (6) is a coefficient at the time t, and a value obtained by multiplying the coefficient represented by Expression (6) by -0.5 is the second coefficient. Expression (7) represents the amount of power supplied to the power grid 40 at the time t. For example, Formula (5) corresponds to income [yen] from selling power to the power grid 40.

[Formula 8]

$$OBJ_{exp}^{dr} = \Sigma_{t=1}^{T}(-0.5 \cdot C_t^{price\_ldr} \cdot x_t^{ldr} - 0.5 \cdot C_t^{price\_udr} \cdot x_t^{udr}) \quad (8)$$

Formula (8) represents the value obtained by multiplying the reduced power amount by the third coefficient.

[Expression 9]

$$C_t^{price\_ldr} \quad (9)$$

[Expression 10]

$$x_t^{ldr} \quad (10)$$

[Expression 11]

$$C_t^{price\_udr} \quad (11)$$

[Expression 12]

$$x_t^{udr} \quad (12)$$

Here, Expression (9) is a coefficient at the time t, and a value obtained by multiplying the coefficient represented by Expression (9) by -0.5 is the third coefficient. Expression (10) represents the possible amount of down DR at the time t, that is, the reduced power amount. Further, Expression (11) is a coefficient at the time t, and a value obtained by multiplying the coefficient represented by Expression (11) by -0.5 is the fourth coefficient. Expression (12) represents the possible amount of up DR at the time t, that is, the load increase/decrease amount. For example, Formula (8) corresponds to income [yen] by demand response.

[Formula 13]

$$OBJ_{exp}^{h2} = \Sigma_{t=1}^{T}(-C^{price\_h2} \cdot x_t^{ship}) \quad (13)$$

Formula (13) represents the value obtained by multiplying the production amount of hydrogen by the fifth coefficient.

[Expression 14]

$$-C^{price\_h2} \quad (14)$$

[Expression 15]

$$x_t^{ship} \quad (15)$$

Here, Expression (14) represents the fifth coefficient. Expression (15) represents the production amount of hydrogen at the time t. For example, Formula (13) corresponds to income [yen] from selling hydrogen.

The calculator 310d illustrated in FIG. 2 performs calculation in such a manner that the evaluation function represented by Formula (1) has a minimum value, as represented by Formula (16). It is possible to remove an item that is not added to the evaluation function by setting its corresponding coefficient to 0. For example, when up DR is not performed, the coefficient represented by Expression (11) is set to 0.

[Formula 16]

$$E = \min(OBJ_{exp}^{gr\_pchs} + OBJ_{exp}^{gr\_sell} + OBJ_{exp}^{dr} + OBJ_{exp}^{h2}) \quad (16)$$

Figure 13:
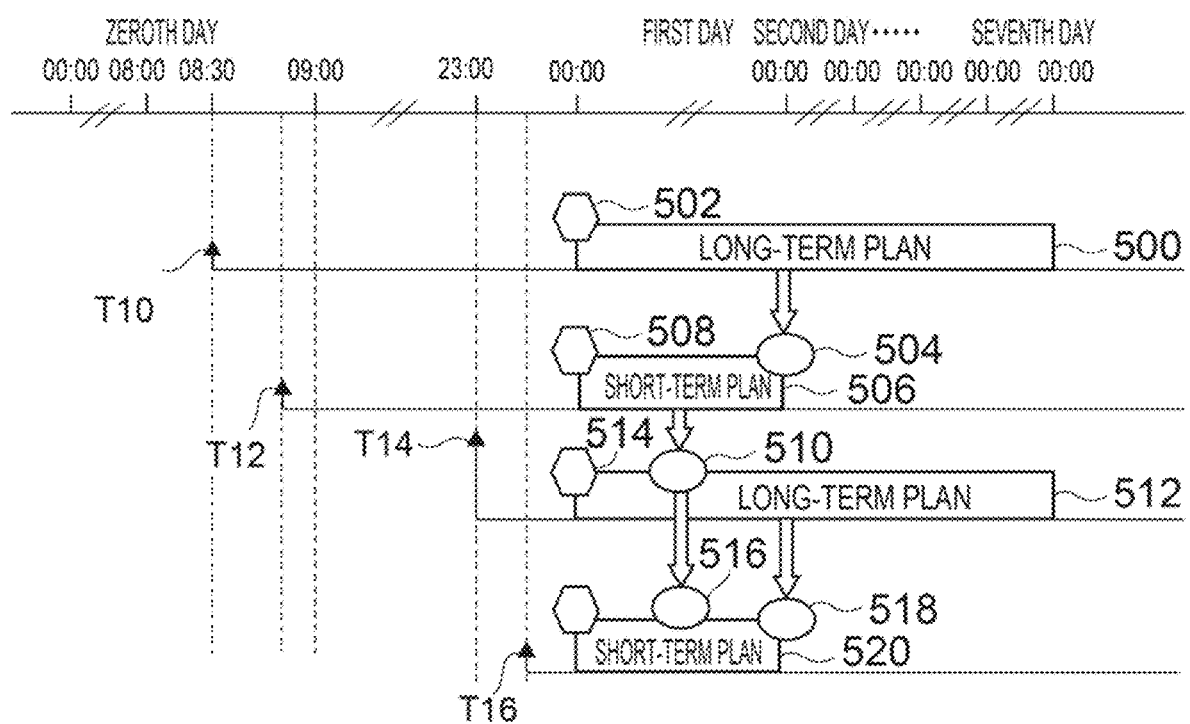
FIG. 13 is a diagram illustrating an example of time scheduling of a long-term plan and a short-term plan.

FIG. 13 is a diagram illustrating an example of time scheduling of a long-term plan and a short-term plan. The horizontal axis represents a time. The first planner 308 (FIG. 2) starts generation of a long-term plan 500 for seven days including the first day, for example, at 8:30 on the zeroth day which is a time T10. An initial condition 502 when the first planner 308 (FIG. 2) generates the long-term plan 500 is set from past data including the zeroth day. The first planner 308 (FIG. 2) plans, for each day, the liquefied-hydrogen tank remaining amount, the shipping amount of hydrogen, the target hydrogen remaining amount, the average overall plant power consumption of the entire hydrogen system 10, and the average EC input power as described before, and supplies them to the calculator 310d as a termination condition 504 of a short-term plan 506.

In order to generate the short-term plan 506, the calculator 310 starts calculation from, for example, 9:00 on the zeroth day which is a time T12 in such a manner that the evaluation function represented by Formula (1) has an extreme value. An initial condition 508 when the calculator 310 calculates information for generating the short-term plan 506 is set from past data including the zeroth day. That is, the calculator 310 performs calculation in such a manner that the evaluation function represented by Formula (1) has an extreme value, using necessary information among the liquefied-hydrogen tank remaining amount, the shipping amount of hydrogen, the target hydrogen remaining amount, the daily average overall plant power consumption of the entire hydrogen system 10, and the average EC input power that are for each day and are included in the termination condition 504 as constraint conditions, and using the initial condition 508.

Figure 14:
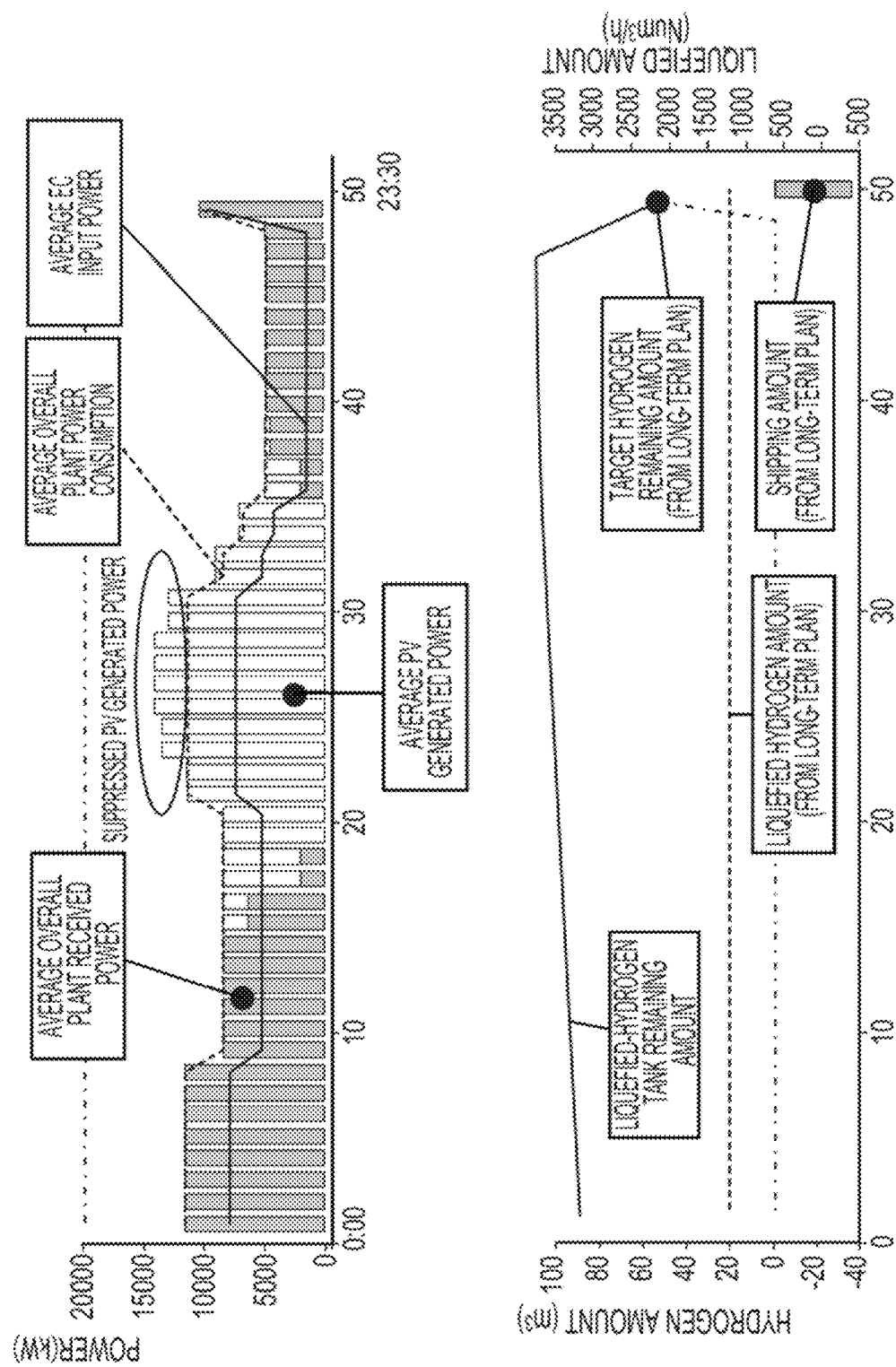
FIG. 14 is a diagram illustrating an example in which a short-term plan generated by a second planner is displayed as an image.

FIG. 14 illustrates an example in which the short-term plan 506 generated by the second planner 310 is displayed as an image on the display 316 based on the result of calculation by the calculator 310. The upper diagram illustrates, for every 30 minutes, the estimated first power of the renewable-energy power generator 20 as average PV generated power, power consumption of the entire hydrogen system 10 as average overall plant power consumption, the second power supplied from the power grid 40 as average overall plant received power, and input power of the hydrogen production device 100 as EC average input power.

The lower diagram illustrates the liquefied hydrogen amount that is the hydrogen production amount of the hydrogen production device 100, the liquefied-hydrogen tank remaining amount stored in the liquefied hydrogen tank 112, the shipping amount of hydrogen, and the target hydrogen remaining amount. The horizontal axis represents dates, the vertical axis in the upper diagram represents power, and the vertical axis in the lower diagram represents the amount of hydrogen.

As illustrated in FIG. 14, the calculator 310d calculates the first power, the reduced power amount, and the hydrogen production amount every predetermined time t, such as every 30 minutes in such a manner that the evaluation function represented by Formula (1) has an extreme value. In this calculation, the calculator 310d uses the baseline and the reduced power amount, and the load increase/decrease amount calculated by the first setter 310a and the second setter 310b. Further, an estimated value of the first estimator 306 is used as the power generation amount of the renewable-energy power generator 20 for each predetermined time t.

Figure 15:
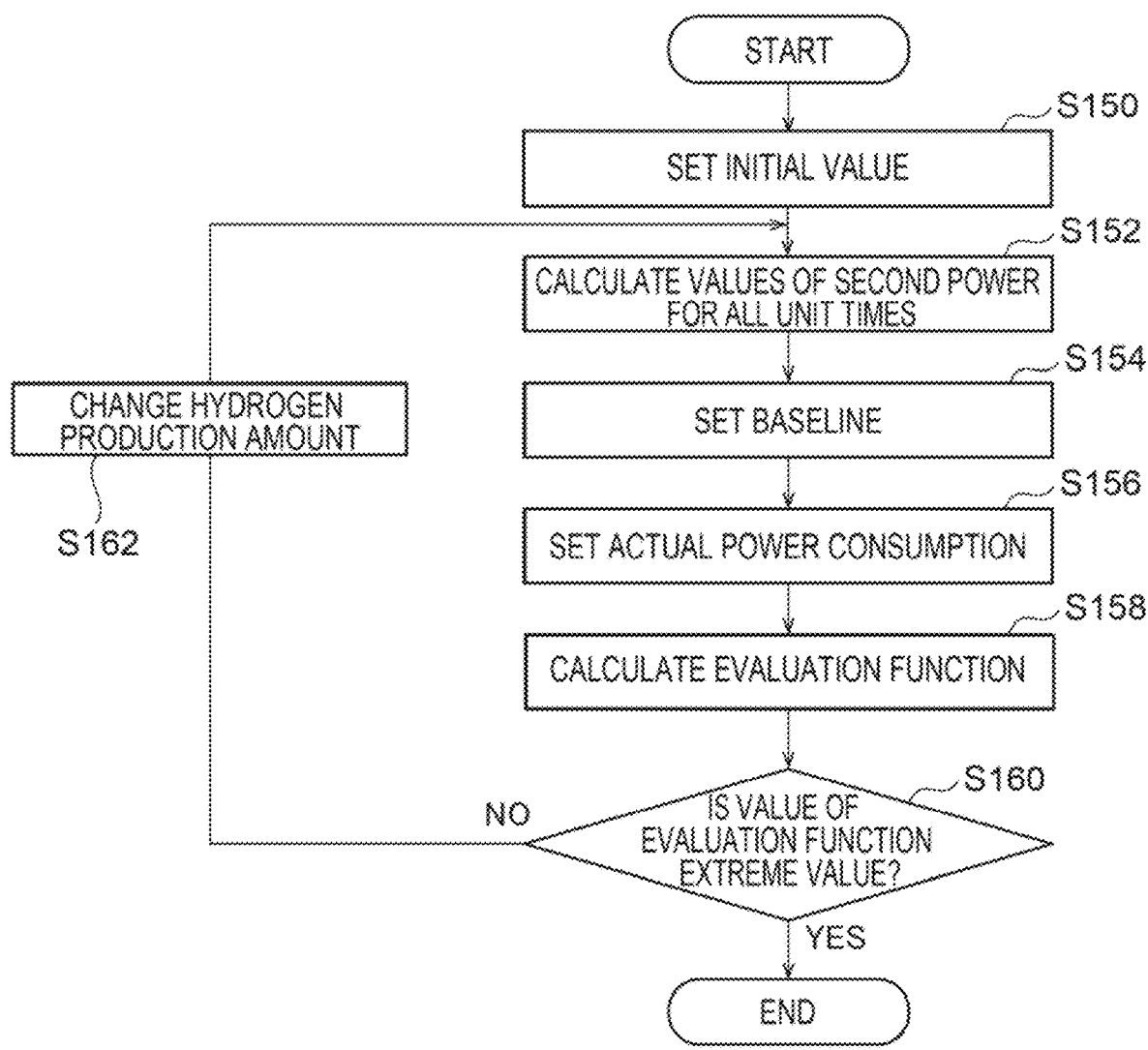
FIG. 15 is a flowchart illustrating a processing example of a calculator 310.

FIG. 15 is a flowchart illustrating a processing example of the calculator 310. Here, with reference to FIGS. 9 and 13, an example is described in which power corresponding to the hydrogen production amounts for all unit times within a period of the short-term plan 506 is changed using the termination condition 504 and the initial condition 508 as constraint conditions.

First, the calculator 310d sets power corresponding to the hydrogen production amounts for all unit times within a period of the short-term plan 506 as initial values, based on the termination condition 504 (Step S150).

Next, the calculator 310d calculates values of the second power for all unit times within the period of the short-terms plan 506 excluding the request period T82, using the power corresponding to the hydrogen production amounts for all the unit times and the estimated values of the first power for all the unit times (Step S152).

Next, the first setter 310a sets the baseline 910 based on a value obtained by adding a difference value between an average value of the second power corresponding to the predetermined time zone T82 on a plurality of days before the date including the request period T82 and an average value of the second power in the predetermined time zone T82 to an average value of the second power corresponding to the request period T82 on these days (Step S154). In this case, when the plural days include a past day, an actual value of the second power included in the initial condition 508 is used. Meanwhile, when the plural days include a future day, a calculation value of the calculator 310d is used.

Next, the second setter 310b sets the actual power consumption amount within the request period T82 based on the possible amount of hydrogen production of the hydrogen system 10 in the second period in the first period (24 hours) excluding the request period T82 (Step S156). That is, the second setter 310b sets the actual power consumption amount in a range in which the hydrogen system 10 can achieve the target hydrogen amount to be produced in the first period (24 hours) that includes the request period T82 and is longer than the request period T82. Further, in this setting, the second setter 310b may set the actual power consumption amount in a range in which the target hydrogen amount can be produced also in a case where the first power supplied during the request period T82 is 0 or a predetermined value or less.

Next, the calculator 310d calculates a value of an evaluation function (Step S158). The calculator 310d then determines whether the value of the evaluation function is an extreme value (Step S160). Here, it may be determined whether a predetermined number of calculations has been performed.

If the value of the evaluation function is an extreme value (YES at Step S160), the processing is ended. On the other hand, if the value of the evaluation function is not an extreme value (NO at Step S160), a value/values of power corresponding to the hydrogen production amount for all or some of the unit times within the period of the short-term plan 506 is/are changed using the termination condition 504 as constraint conditions (Step S162), and the processing is repeated from Step S152. For example, the value of power may be changed by Monte Carlo simulation. In this manner, the calculator 310d performs calculation in such a manner that the value of the evaluation function has an extreme value, using the termination condition 504 as constraint conditions.

Referring back to FIG. 13, the first planner 308 (FIG. 2) restarts generation of a long-term plan 512 for seven days including the first day, for example, at 23:30 on the zeroth day which is a time T14. An initial condition 514 when the first planner 308 (FIG. 2) generates the long-term plan 512 includes past data until 23:30 on the zeroth day and the actual power consumption amount within the request period 180 in the short-term plan 506. The first planner 308 (FIG. 2) replans, for each day, the liquefied-hydrogen tank remaining amount, the shipping amount of hydrogen, the target hydrogen remaining amount, the average overall plant power consumption of the entire hydrogen system 10, and the average EC input power as described before, and supplies them to the calculator 310d as a termination condition 518 of a short-term plan 520.

In order to generate the short-term plan 520 again, the calculator 310 starts calculation from, for example, 23:45 on the zeroth day which is a time T16 in such a manner that the evaluation function represented by Formula (1) has an extreme value. An initial condition 522 when the calculator 310 generates the short-term plan 520 includes past data until 23:30 on the zeroth day and the actual power consumption amount within the DR request period T80 in the short-term plan 506. That is, the calculator 310 performs calculation again in such a manner that the evaluation function represented by Formula (1) has an extreme value, using information required for processing among the liquefied-hydrogen tank remaining amount for each day, the shipping amount of hydrogen for each day, the target hydrogen remaining amount for each day, the average overall plant power consumption of the entire hydrogen system 10 for each day, the average EC input power for each day, the baseline calculated by the first setter 310a, and the reduced power amount calculated by the second setter 310b, all of which are included in the termination condition 518, as constraint conditions and using the initial condition 522, The second planner 310 (FIG. 2) then outputs the result of calculation by the calculator 310 to the image processor 312. Accordingly, the image processor 312 generates the image data illustrated in FIG. 14 described above, for example. Further, the controller 313 (FIG. 2) described above executes control based on the result of calculation by the calculator 310d.

Figure 16:
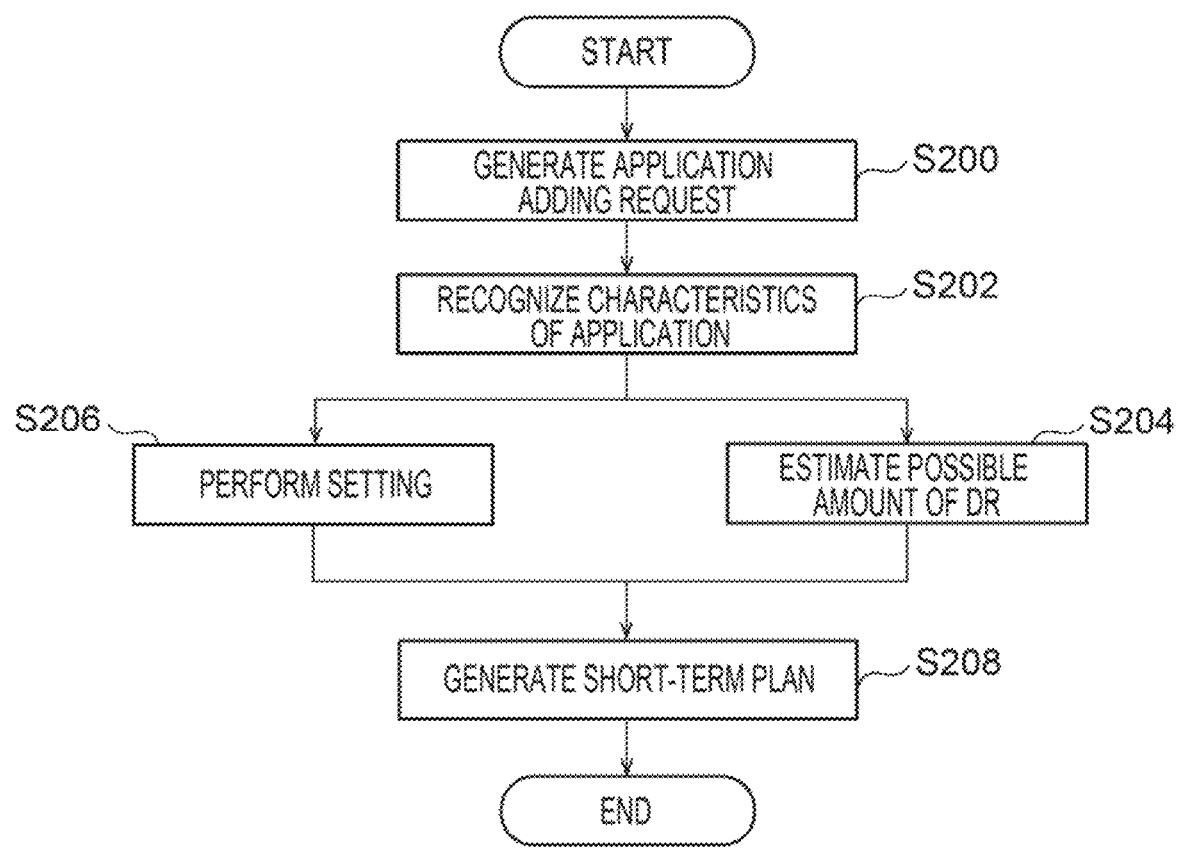
FIG. 16 is a flowchart illustrating a processing example of the control device.

FIG. 16 is a flowchart illustrating a processing example of the control device 30 according to the present embodiment. First, the first estimator 306 estimates the power generation amount of the renewable-energy power generator 20, for example, in units of 30 minutes based on weather forecast data acquired by the communicator 304 (Step S200). Further, the first estimator 306 adds the power generation amounts estimated in units of 30 minutes in units of 24 hours to calculate an estimated power generation amount for each day.

Next, the first planner 308 generates a long-term plan including information such as the liquefied-hydrogen tank remaining amount for each day, the shipping amount of hydrogen for each day, the target hydrogen remaining amount for each day, average overall plant power consumption of the entire hydrogen system 10 for each day, and average EC input power, using the estimated power generation amount for each day, and an initial condition (step S202). These pieces of information are supplied to the calculator 310d as a termination condition of a short-term plan.

Next, the calculator 310d calculates an extreme value of the evaluation formula (1) using the initial condition and the termination condition. In this calculation, the calculator 310d uses the baseline and the actual power consumption calculated by the first setter 310a and the second setter 310b. The reduced power amount at the time when the extreme value is obtained is then set as an estimated value of DR possible amount (Step S204).

Further, when calculating the extreme value of the evaluation formula (1), the calculator 310d sets the EC performance of the hydrogen production device 100 by using the baseline and the load reduction amount calculated by the first setter 310a and the second setter 310b as constraint conditions. For example, the EC performance is a time required for starting or stopping the hydrogen production device (Step S206).

The second planner 310 generates a short-term plan including planning information for every 30 minutes, such as the first power, power consumption of the entire hydrogen system 10, the second power supplied from the power grid 40, input power of the hydrogen production device 100, the estimated value of DR possible amount, and the hydrogen production amount based on the calculation result at the time when the extreme value of the evaluation formula (1) is obtained (Step S208), and the processing is ended.

As described above, according to the first embodiment, the second setter 310b sets the actual power consumption amount of the second power that is set in advance in the request period T80 of demand response, in a range in which a hydrogen system can achieve a target amount of hydrogen to be produced in the first period longer than the request period T80. Accordingly, even if demand response is performed, it is possible to produce the target amount of hydrogen with higher accuracy.

Second Embodiment

The hydrogen energy system 1 according to a second embodiment is different from the hydrogen energy system 1 according to the first embodiment in producing compressed hydrogen in place of liquefied hydrogen. In the following descriptions, differences from the hydrogen energy system 1 according to the first embodiment are explained.

Figure 17:
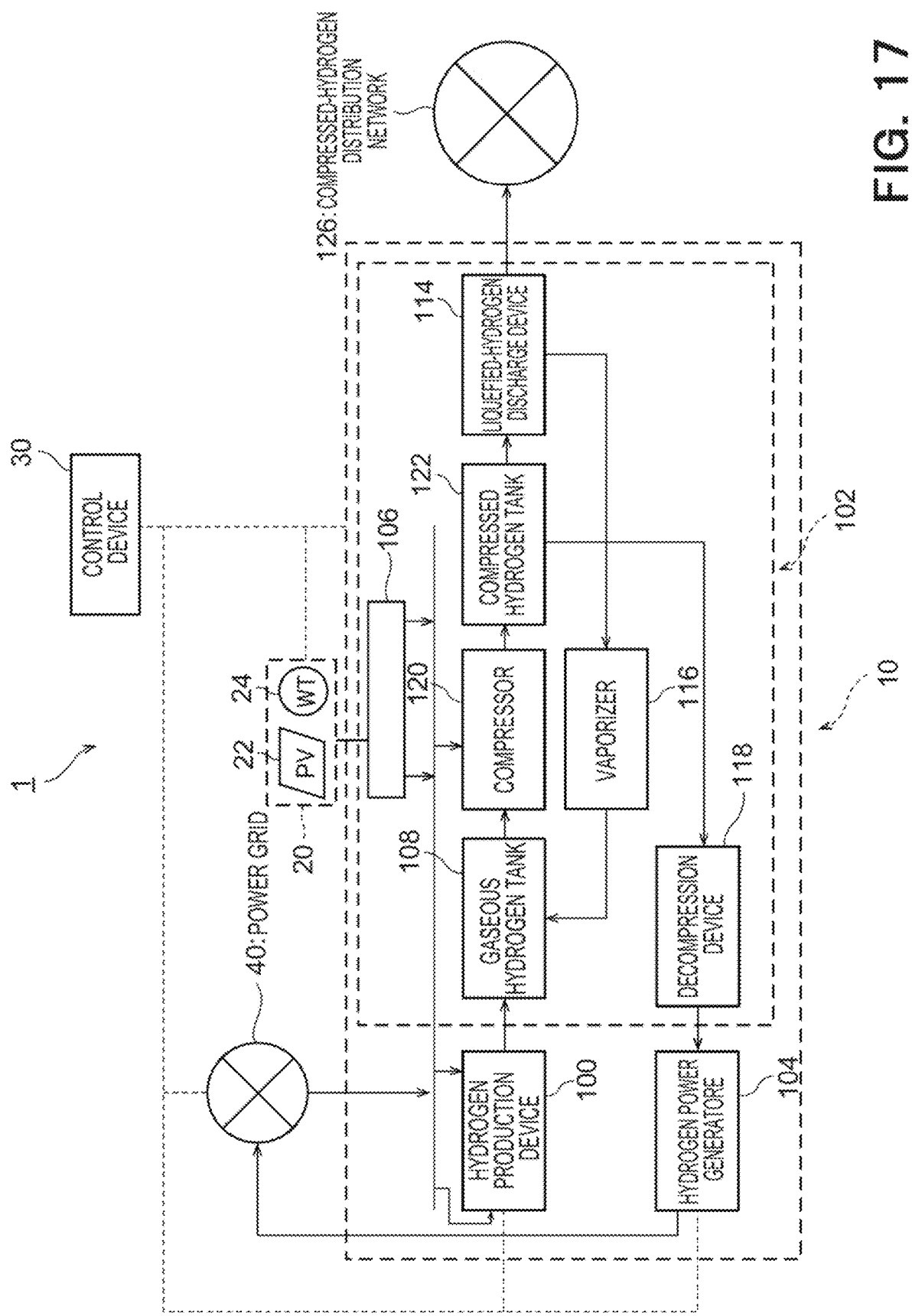
FIG. 17 is a block diagram illustrating a configuration of a hydrogen energy system according to a second embodiment.

FIG. 17 is a block diagram illustrating a configuration of the hydrogen energy system 1 according to the second embodiment. As illustrated in FIG. 17, the hydrogen energy system 1 according to the present embodiment is a system that produces compressed hydrogen. That is, this hydrogen storage and supply device 102 is different from the hydrogen storage and supply device 102 according to the first embodiment in including a compressor 120, a compressed hydrogen tank 122, and a compressed-hydrogen discharge device 124.

The compressor 120 compresses gaseous hydrogen supplied from the gaseous hydrogen tank 108 to convert it into compressed hydrogen, and supplies the compressed hydrogen to the compressed hydrogen tank 122 via a pipe. The compressed hydrogen tank 122 stores therein the compressed hydrogen supplied from the compressor 120. The compressed hydrogen tank 122 stores therein the liquefied hydrogen supplied from the compressor 120 and also supplies the compressed hydrogen to the compressed-hydrogen discharge device 124 via a pipe. The compressed-hydrogen discharge device 124 supplies the compressed hydrogen supplied from the compressed hydrogen tank 122 to a compressed-hydrogen distribution network 126.

Figure 18:
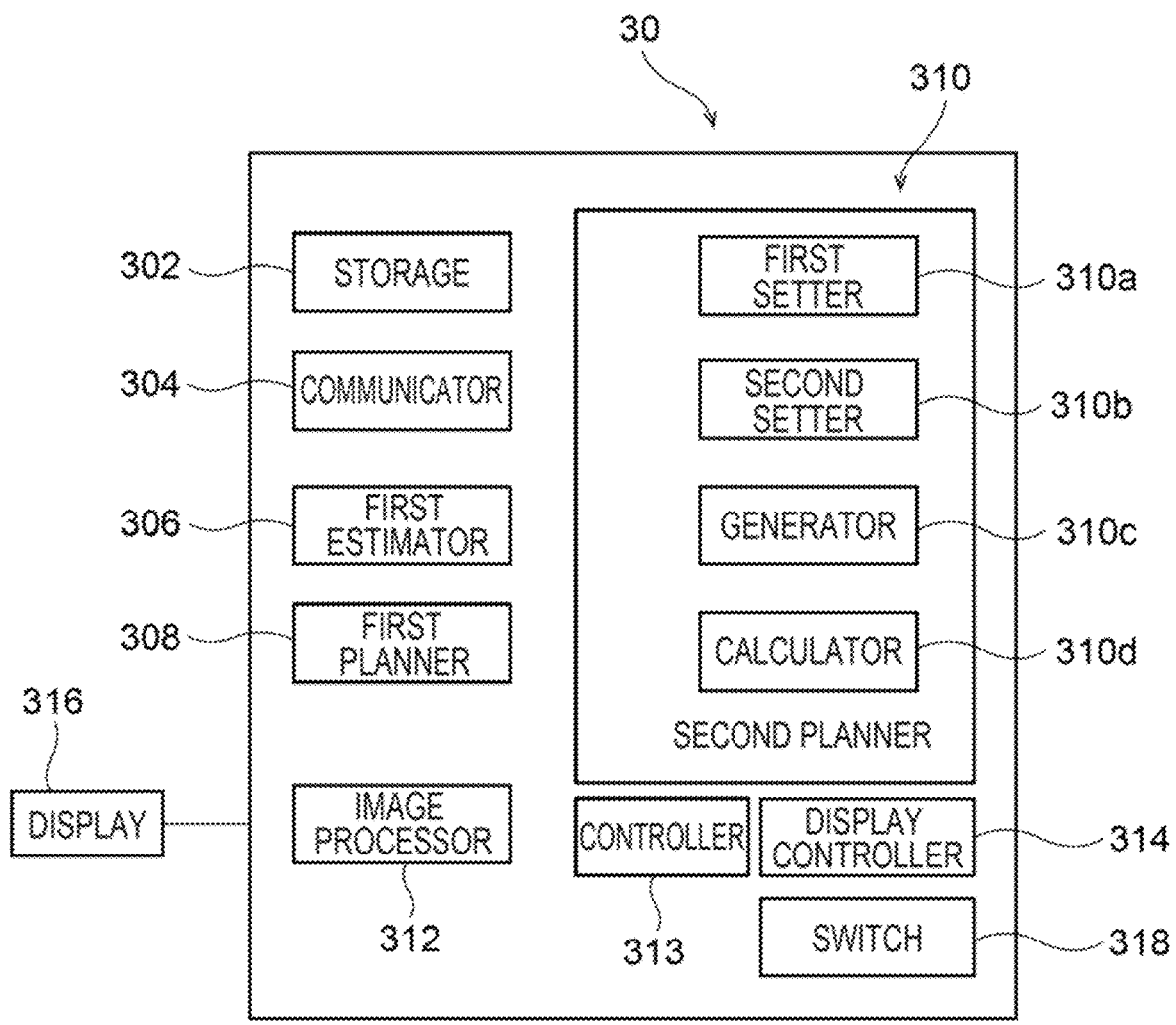
FIG. 18 is a block diagram illustrating a configuration of the control device according to the second embodiment.

FIG. 18 is a block diagram illustrating a configuration of the control device 30 according to the second embodiment. As illustrated in FIG. 18, the control device 30 according to the second embodiment further includes a switch 318.

The switch 318 changes the processing contents of the first planner 308 and the second planner 310 in accordance with a supply mode of hydrogen produced by the hydrogen energy system 1. More specifically, in a case where the hydrogen energy system 1 supplies compressed hydrogen to the compressed-hydrogen distribution network 126, the first planner 308 plans, for every 30 minutes, the liquefied-hydrogen tank remaining amount, the shipping amount of hydrogen, the target hydrogen remaining amount, average overall plant power consumption of the entire hydrogen system 10, and average EC input power based on an initial condition set from past data. Since compressed hydrogen has a lower compression ratio than liquefied hydrogen and the amount of delivery per shipment is small, the frequency of shipment is high. Therefore, a long-term plan is assumed to be about one to two weeks. Further, the first planner 308 supplies the liquefied-hydrogen tank remaining amount, the shipping amount of hydrogen, the target hydrogen remaining amount, the average overall plant power consumption of the entire hydrogen system 10, and the average EC input power for each day to the second planner 310 as a termination condition.

In a case where the hydrogen energy system 1 supplies compressed hydrogen to the compressed-hydrogen distribution network 126, the calculator 310d of the second planner 310 performs calculation in such a manner that the evaluation function represented by Formula (1) has an extreme value, using the termination condition supplied from the first planner 308 as constraint conditions. A short-term plan is for a period of about one to three days and the evaluation function is in in units of 30 minutes. In this calculation, the calculator 310d uses a baseline, the reduced power amount, and the load increase/decrease amount calculated by the first setter 310a and the second setter 310b. Furthermore, an estimated value of the first estimator 306 is used as the power generation amount of the renewable-energy power generator 20 for each predetermined time t=30 minutes.

The switch 318 may switch between a case of using planning information of the first planner 308 and a case of not using the planning information. More specifically, in a case where compressed hydrogen is supplied to the compressed-hydrogen distribution network 126, the second planner 310 generates a plan for a period of about one to two weeks, in place of the first planner 308. In this case, the calculator 310 of the second planner 310 performs calculation in such a manner that the evaluation function represented by Formula (1) has an extreme value, based on an initial condition set from past data and the target amount of hydrogen for each day. That is, processing in the present embodiment is different from the flowchart in FIG. 16 in that an operator sets the termination condition 504 in the flowchart in FIG. 16. Also in this calculation, the calculator 310d uses the baseline, the actual power consumption, and the like calculated by the first setter 310a and the second setter 310b. Furthermore, the estimated value of the first estimator 306 is used as the power generation amount of the renewable-energy power generator 20 for each predetermined time t=30 minutes. In this case, processing of simplifying a model, partly omitting DR calculation, and the like may be performed. Alternatively, for example, utilization efficiency of the hydrogen production device 100 may be set to a constant value.

As described above, according to the second embodiment, the switch 318 changes the processing contents of the first planner 308 and the second planner 310 based on the type of hydrogen to be processed by the hydrogen energy system 1. Accordingly, also in a case where the hydrogen energy system 1 supplies compressed hydrogen to the compressed-hydrogen distribution network 126, it is possible to obtain effects equivalent to those obtained in the hydrogen energy system according to the first embodiment.

Third Embodiment

The hydrogen energy system 1 according to a third embodiment is different from the hydrogen energy system 1 according to the first embodiment in introducing probability distribution as reliability into the power generation amount of the renewable-energy power generator 20 estimated by the first estimator 306. In the following descriptions, differences from the hydrogen energy system 1 according to the first embodiment are explained.

Figure 19:
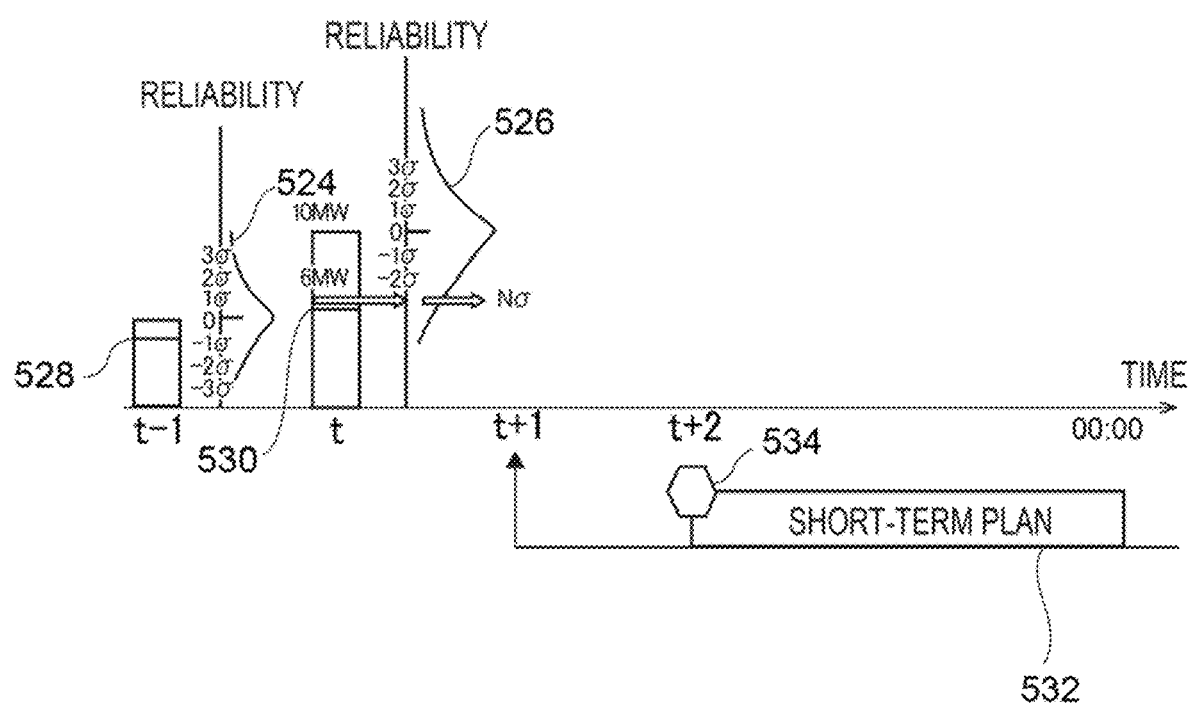
FIG. 19 is a diagram illustrating an example of reliability of a power generation amount.

FIG. 19 is a diagram illustrating an example of reliability of a power generation amount. The horizontal axis represents a time, and the vertical axis represents the estimated power generation amount of the renewable-energy power generator 20 and its reliability.

The first estimator 306 according to the third embodiment attaches reliability to the power generation amount of the renewable-energy power generator 20 for every estimated time unit t, such as every 30 minutes. The reliability is indicated by normal distributions 524 and 526 having a standard deviation σ, for example. Integrated values of the normal distributions 524 and 526 are normalized to 1, and a value of each normal distribution is an occurrence probability and corresponds to a value of reliability. That is, the integrated value of the normal distribution 528 corresponding to a time t−1 and the integrated value of the normal distribution 530 corresponding to the time t are 1.

For example, when minus nσ is set for the first estimator 306, estimated power generation amounts 528 and 530 corresponding to minus nσ are calculated. Accordingly, the second planner 310 generates a short-term plan 532 using these estimated power generation amounts 528 and 530, for example, and an initial condition 534.

As described above, according to the third embodiment, probability distribution is introduced as reliability into the power generation amount of the renewable-energy power generator 20 estimated by the first estimator 306. Accordingly, the second planner 310 can generate a short-term plan reflecting the probability distribution, and can further improve accuracy of the short-term plan.

While certain embodiments have been described, these embodiments have been presented by way of example only, and are not intended to limit the scope of the inventions. The novel apparatus, method, and program described in the present specification may be embodied in a variety of other forms. Further, with regard to the forms of the apparatus, method, and program described in the present specification, various omissions, substitutions, and changes may be made without departing from the spirit of the inventions.

The invention claimed is:

1. A control device for a hydrogen system that produces hydrogen by first power supplied from a renewable-energy power generator and second power supplied from a power grid, the device comprising:
    a first setter configured to set, in a demand-response request period in advance, a baseline indicating a first power consumption amount of the second power to be consumed when there is no request of demand response;
    a second setter configured to set an actual power consumption amount obtained by reducing a reduced power amount from the first power consumption amount in advance, when the demand response for reducing the first power consumption amount in the request period is requested; and
    a controller configured to control a power amount of the second power in the request period based on the actual power consumption amount, wherein
    the second setter is configured to set the actual power consumption amount in a range in which the hydrogen system is able to achieve a target amount of hydrogen to be produced in a first period that includes the request period and is longer than the request period.

2. The device of claim 1, wherein the first setter is configured to set the baseline before a predetermined time zone that is before the request period based on a value of the second power in the predetermined time zone.

3. The device of claim 2, wherein the value of the second power is calculated based on an estimated value of the first power in the predetermined time zone and a hydrogen production amount of the hydrogen system set in the predetermined time zone.

4. The device of claim 2, wherein the first setter is configured to set the baseline based on a value obtained by adding a difference value between an average value of the second power corresponding to the predetermined time zone on a plurality of days before a date including the request period and an average value of the second power in the predetermined time zone, to an average value of the second power corresponding to the request period on the plurality of days.

5. The device of claim 1, wherein the second setter is configured to set the actual power consumption amount based on a possible amount of hydrogen production of the hydrogen system in a second period in the first period excluding the request period.

6. The device of claim 5, wherein the second setter is configured to set the actual power consumption amount in a range in which the target amount of hydrogen is producible even when the first power supplied during the request period is 0 or a predetermined value or less.

7. The device of claim 1, further comprising:
a generator configured to generate an evaluation function in which a value obtained by multiplying an amount of a portion of the first power, which is supplied to the power grid, by a coefficient, a value obtained by multiplying the power amount of the second power by a coefficient, a value obtained by multiplying the reduced power amount by a coefficient, and a value obtained by multiplying a production amount of the hydrogen by a coefficient are added for every unit time in the first period; and
a calculator configured to calculate, for the every unit time, the second power, the first power, the reduced power amount, and the production amount of the hydrogen in such a manner that the evaluation function has an extreme value, wherein
the reduced power amount in the evaluation function is set by calculation processing by the first setter and the second setter, and
the controller executes the control based on a result of calculation by the calculator.

8. The device of claim 7, wherein a power amount of the first power for the every unit time is an estimated value.

9. The device of claim 8, further comprising a first estimator configured to estimate the first power for the every unit time.

10. The device of claim 8, wherein the calculator sets the power amount of the first power based on probability distribution of the first power for the every unit time.

11. The device of claim 7, wherein the calculator is configured to calculate the second power for the every unit time based on an estimated value of the first power for the every unit time and a hydrogen production amount of the hydrogen system set for the every unit time.

12. The device of claim 7, further comprising a first planner configured to plan a power amount of the first power for each day, a power amount of the second power for each day, and a production amount of the hydrogen for each day, wherein
the calculator is configured to perform calculation in such a manner that the first power for the every unit time, the second power for the every unit time, and the production amount of the hydrogen for the every unit time match the power amount of the first power for each day, the power amount of the second power for each day, and the production amount of the hydrogen for each day.

13. The device of claim 12, further comprising a switch configured to switch between a case of using planning information of the first planner and a case of not using the planning information in accordance with a supply mode of hydrogen produced by the hydrogen system.

14. The device of claim 1, wherein the target amount of hydrogen is any of a target value of a hydrogen storage amount, integration of liquefied hydrogen amount, integration of compressed hydrogen amount, and integration of a production amount of gaseous hydrogen of a hydrogen production device.

15. A control method for a hydrogen system that produces hydrogen by first power generated by a renewable-energy power generator and second power supplied from a power grid, the method comprising:
a first setting step of setting, in a demand-response request period in advance, a baseline indicating a first power consumption amount of the second power to be consumed when there is no request of demand response;
a second setting step of setting an actual power consumption amount obtained by reducing a reduced power amount from the first power consumption amount in advance, when the demand response for reducing the first power consumption amount in the request period is requested; and
a controlling step of controlling a power amount of the second power in the request period based on the actual power consumption amount, wherein
the second setting step sets the actual power consumption amount in a range in which the hydrogen system is able to achieve a target amount of hydrogen to be produced in a first period that includes the request period and is longer than the request period.

* * * * *